(12) United States Patent
Ito

(10) Patent No.: US 7,934,836 B2
(45) Date of Patent: May 3, 2011

(54) PROJECTOR THAT IS CAPABLE OF SUPERIMPOSING AND DISPLAYING A VISIBLE IMAGE AND AN INVISIBLE INFRARED IMAGE

(75) Inventor: Yoshitaka Ito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 478 days.

(21) Appl. No.: 12/015,819

(22) Filed: Jan. 17, 2008

(65) Prior Publication Data

US 2008/0174742 A1 Jul. 24, 2008

(30) Foreign Application Priority Data

Jan. 22, 2007 (JP) ................................. 2007-011378

(51) Int. Cl.
*G03B 21/00* (2006.01)

(52) U.S. Cl. .............................. 353/31; 353/34; 348/751

(58) Field of Classification Search .................... 353/20, 353/31, 33, 34, 81; 359/668–671, 443, 449, 359/451, 456, 460; 349/25, 27, 30; 348/751
See application file for complete search history.

(56) References Cited

U.S. PATENT DOCUMENTS

| | | | |
|---|---|---|---|
| 4,723,077 A * | 2/1988 | Wu ............................ | 250/504 R |
| 6,018,374 A | 1/2000 | Wrobleski | |
| 6,409,349 B1 * | 6/2002 | O'Connor ....................... | 353/31 |
| 6,439,724 B1 | 8/2002 | Jeon et al. | |
| 6,559,883 B1 * | 5/2003 | Fancher et al. ............... | 348/164 |
| 6,975,366 B2 * | 12/2005 | Flint ............................. | 348/744 |
| 7,018,045 B2 | 3/2006 | Tomita | |
| 7,293,877 B2 | 11/2007 | Inoue | |
| 2003/0067538 A1 * | 4/2003 | Myers ............................. | 348/47 |
| 2004/0239889 A1 * | 12/2004 | Inamoto .......................... | 353/69 |

(Continued)

FOREIGN PATENT DOCUMENTS

EP 1 011 005 A2 6/2000

(Continued)

OTHER PUBLICATIONS

Shirai et al., "Presenting Information on Real Environments with IR Projector", *Information Processing Technology Letters* (FIT2003), vol. 2, pp. 287-289 (2003).

*Primary Examiner* — Thanh X Luu
*Assistant Examiner* — Francis M Legasse, Jr.
(74) *Attorney, Agent, or Firm* — Oliff & Berridge, PLC

(57) ABSTRACT

A projector includes a light source that emits light including visible light and infrared light, a light separating unit that separates the light from the light source into lights in plural different wavelength regions, at least one light modulation element for visible light that modulates visible light separated by the light separating unit, at least one light modulation element for infrared light that modulates one kind of infrared light or at least two kinds of infrared light in wavelength regions different from each other separated by the light separating unit, a light combining unit that combines the modulated light modulated by the light modulation element for visible light and the modulated light modulated by the light modulation element for infrared light into one to form combined light, and a projecting unit that projects and displays the combined light combined by the light combining unit on a projection surface. The projector superimposes and displays a visible light image formed by the light modulation element for visible light and an infrared image formed by the light modulation element for infrared light on the identical projection surface.

12 Claims, 17 Drawing Sheets

U.S. PATENT DOCUMENTS

2005/0035943 A1* 2/2005 Kojima ............. 345/156
2007/0103768 A1* 5/2007 Blackham ............ 359/355

FOREIGN PATENT DOCUMENTS

| | | |
|---|---|---|
| JP | A-2001-5098 | 1/2001 |
| JP | A-2004-144907 | 5/2004 |
| JP | A-2005-26759 | 1/2005 |
| JP | A-2005-62748 | 3/2005 |
| JP | A-2005-301243 | 10/2005 |

* cited by examiner

PROJECTOR THAT IS CAPABLE OF SUPERIMPOSING AND DISPLAYING A VISIBLE IMAGE AND AN INVISIBLE INFRARED IMAGE

BACKGROUND

1. Technical Field

The present invention relates to a projector, and, more particularly to a projector that can display a visible image and an infrared image on one screen.

2. Related Art

A projector that displays an optical image, which is image information formed on a light modulation element, on a screen in enlargement is highly consistent with digital apparatuses such as a computer. Therefore, the projector is widely used mainly for presentation, information provision, and video entertainment. Since a major function of a general display apparatus including the projector is to communicate some meaningful information to people, image information is usually displayed as a visible image that people can visually recognize. Therefore, a general projector selects visible light from light radiated from a light source and uses the visible light as illumination light to perform image display.

It is said that, when meaningful information is displayed for presentation or information provision, there is an information amount suitable for display in terms of visibility, readability, information acceptability, and the like. This is because, when an excessively large amount of information is displayed at a time, people cannot accurately grasp the information, for example, it is difficult to find necessary information in busy streets in large cities where a large number of signboards are hanged out, but also tend to neglect to pay attention to individual pieces of information.

For presentation and video entertainment, it is significant to ensure security of information to be displayed. As a growing social problem, presentation information and video information are photographed and diverted without permission of copyright holders.

To cope with such a problem, it is considered to control displayed information (images and videos) using infrared light that people cannot visually recognize. People cannot recognize an image displayed by the infrared light (an infrared image). However, since an imaging device represented by a CCD and a CMOS sensor has sensitivity covering an infrared region, people can visually recognize display content using the imaging device. For example, in Yoshinari Shirai and Mitsunori Matsushita, "Proposal of Method of Providing Information to an Actual Environment using an IR projector", Information Processing Technology Letters (FIT2003), Vol. 2, pp. 287 to 289, 2003 (see FIG. 1), a method of using a normal projector for visible light, which displays a color visible image, and a projector for infrared light, which displays an image with infrared light, in combination to thereby control information (images and videos) to be displayed is proposed. Specifically, information desired to be shown to an unspecified large number of people to communicate presence and an outline of information is displayed as a visible image and information desired to be shown to people who require more detailed information is displayed as an invisible infrared image. People see the invisible infrared image using an imaging device such as a digital camera.

From the viewpoint of ensuring of security of information, for example, U.S. Pat. No. 6,018,374 proposes a method of projecting, using a projector for infrared light, an infrared image over an image projected on a screen, and causing, when the image projected on the screen is imaged by an imaging device such as a digital video or a digital camera, the infrared image to be taken into the imaged image to thereby inform a copyright holder that the photographing is an illegal act and prevent secret photography and the like.

As described in the documents described above, when the techniques are adopted, it is possible to control displayed information (images and videos) by displaying an invisible infrared image over a visible image displayed on a screen. Therefore, the techniques are useful for prevention of illegal acts such as secret photography. However, in addition to a projector that projects and displays the original information, a second projector that projects the infrared image is necessary. Taking into account the fact that there is an increasing number of portable projectors according to a reduction in size of projectors, portability is impeded when the two projectors are used. Moreover, in using the two projectors, it is necessary to accurately adjust projection and display positions of the projectors to each other. Every time each of the two projectors is moved, work for accurately adjusting projection and display positions of the projectors to each other is necessary. In particular, since the infrared image is an invisible image, the work cannot be performed visually. Therefore, installability and usability are extremely deteriorated.

SUMMARY

An advantage of some aspects of the invention is to provide a projector that alone is capable of superimposing and displaying a visible image and an invisible infrared image on one projection surface in order to control display images (images and videos) and is simple and excellent in portability.

According to a first aspect of the invention, there is provided a projector including a light source that emits light including visible light and infrared light, light separating means for separating the light from the light source into lights in plural different wavelength regions, at least one light modulation element for visible light that modulates visible light separated by the light separating means, at least one light modulation element for infrared light that modulates one kind of infrared light or at least two kinds of infrared light in wavelength regions different from each other separated by the light separating means, light combining means for combining the modulated light modulated by the light modulation element for visible light and the modulated light modulated by the light modulation element for infrared light into one to form combined light, and projecting means for projecting and displaying the combined light combined by the light combining means on a projection surface. The projector superimposes and displays a visible light image formed by the light modulation element for visible light and an infrared image formed by the light modulation element for infrared light on the identical projection surface.

According to a second aspect of the invention, there is provided a projector including a first light source that emits light including visible light, a second light source that emits light including infrared light, light separating means for separating the light from at least the light source of the first light source and the second light source into lights in plural wavelength regions different from one another, at least one light modulation element for visible light that modulates visible light separated by the light separating means, at least one light modulation element for infrared light that modulates infrared light from the second light source, light combining means for combining the modulated light modulated by the light modulation element for visible light and the modulated light modulated by the light modulation element for infrared light into one to form combined light, and projecting means for projecting and displaying the combined light combined by the light combining means on a projection surface. The projector superimposes and displays a visible light image formed by the light modulation element for visible light and an infrared image formed by the light modulation element for infrared light on the identical projection surface.

According to a third aspect of the invention, there is provided a projector including plural light sources having light emission wavelength regions different from one another, at least one light modulation element for visible light that modulates visible light emitted from each of the plural light sources, at least one light modulation element for infrared light that modulates one kind of infrared light or at least two kinds of infrared light in wavelength regions different from each other emitted from each of the plural light sources, light combining means for combining the modulated light modulated by the light modulation element for visible light and the modulated light modulated by the light modulation element for infrared light into one to form combined light, and projecting means for projecting and displaying the combined light combined by the light combining means on a projection surface. The projector superimposes and displays a visible light image formed by the light modulation element for visible light and an infrared image formed by the light modulation element for infrared light on the identical projection surface.

According to the first to third aspects of the invention, it is possible to independently control display states of a visible image and an invisible infrared image, display both the images on one projection surface in an accurately superimposed state, and control displayed information (images and videos). Since superimposition and display of the visible image and the infrared image can be performed by one projector, even when the projector is moved, work for adjusting display positions of the visible image and the infrared image to each other is unnecessary and usability can be substantially improved. Further, since an entire display system can be reduced in size, the projector is excellent in portability. The projectors according to the first to third aspects are distinguished from one another according to the structure of the light sources. The projector according to the first aspect uses the light source (e.g., a white light source) that emits light including visible light and infrared light. The projector according to the second aspect uses both the first light source (e.g., a white light source) that emits light including visible light and the second light source (e.g., an infrared light source) that emits light including infrared light. The projector according to the third aspect uses the light sources exclusively used for respective color lights and infrared lights, respectively.

When at least three light modulation elements for visible light that modulate at least three kinds of visible light in wavelength regions different from one another are used as the light modulation elements for visible light of the projectors according to the first to third aspects, it is possible to obtain a color visible light image and an infrared image.

It is desirable that the light modulation element for visible light and the light modulation element for infrared light are light modulation elements having identical dimensions of an image display area and identical resolution.

With this structure, it is possible to easily realize display in which one pixel of a visible image and one pixel of an infrared image are associated with each other. Consequently, it is possible to finely control displayed information at a level of local data in an image (e.g., in pixel units). Moreover, since it is unnecessary to prepare plural kinds of light modulation elements having different specifications, it is easy to reduce cost of the apparatus.

The projector may further include infrared-light separating means for separating the infrared light into plural infrared lights in wavelength regions different from one another and plural light modulation elements for infrared light that respectively modulate the plural infrared lights in wavelength regions different from one another separated by the infrared-light separating means.

With this structure, since two or more kinds of infrared images can be independently displayed, various kinds of control for displayed information are possible.

It is desirable that the light combining means is a prism made of a medium having a refractive index larger than a refractive index of the air.

With this structure, since the light combining means is the prism, it is possible to reduce an optical path length. Therefore, even when, because a large number of light modulation elements are used, distances between the light modulation elements and the projecting means are inevitably large, it is possible to realize a reduction in size and cost of the projecting means and an increase in luminance of the projector through improvement in light usage efficiency. As the refractive index of the medium forming the prism is higher, the optical path length can be suitably reduced.

It is desirable that a distance (L) from the light modulation element for visible light to the projecting means and a distance (LIR) from the light modulation element for infrared light to the projecting means are set different from each other. Specifically, it is desirable that L<LIR.

For example, when a lens is used for the projecting means, since a lens glass material forming the lens has wavelength dependency of a refractive index, an optical aberration such as a color aberration inevitably occurs. Even when a focal length of the projecting means has wavelength dependency, a distance from the light modulation element for visible light to the projecting means and a distance from the light modulation element for infrared light to the projecting means are set different to make it easy to suppress occurrence of an optical aberration between visible images and between a visible image and an infrared image. It is possible to align focus positions of respective display images (control defocusing) to control the fall in resolution and realize improvement in a quality of the display images. Moreover, when there are plural light modulation elements for visible light, distances from the light modulation elements to the projecting means may be set different from one another.

As another method of realizing improvement in an image quality by suppressing occurrence of an optical aberration, a medium having a large Abbe number (small wavelength dependency of a refractive index) may be used for the prism. From the same viewpoint, it is also suitable to use an anomalous dispersion medium (glass) having unusual wavelength dependency of a refractive index.

It is desirable that, when the light modulation element for infrared light is a liquid crystal light valve, a polarizer attached to the liquid crystal light valve is a light reflective polarizer or a light absorptive polarizer containing metal.

When the light modulation element for infrared light is the liquid crystal light valve, polarizers are necessary on a light incidence side and a light exiting side of the liquid crystal light valve. However, when infrared light is irradiated on the light modulation element and the polarizers, the light modulation element and the polarizers are easily charged with heat compared with irradiation of visible light and deterioration of the light modulation elements and the polarizers tends to occur. When the light reflective polarizer is used, since the light reflective polarizer absorbs little light, it is possible to control heat charging of the light reflective polarizer. Alternatively, since the light absorptive polarizer containing metal is excellent in heat resistance and less easily deteriorated by heat charging, the light absorptive polarizer is suitable in such a form of use.

The light modulation element for visible light and the light modulation element for infrared light may be any one of a transmissive liquid crystal light valve, a reflective liquid crystal light valve, and a micromirror array element.

In particular, the light modulation element for infrared light tends to be charged with heat when infrared light is irradiated thereon. Therefore, it is suitable to use a reflective element such as the reflective liquid crystal light valve or the micromirror array element because a thermal influence is easily reduced.

It is desirable that the projector has a function of displaying, on the projection surface, a marker that indicates a state of display of the infrared image. Alternatively, it is desirable that the projector includes, in an apparatus main body, an indicator that indicates a state of display of the infrared image.

With this structure, a user and a viewer of the projector can easily discriminate, without using an imaging device such as a camera, whether an infrared image visually unrecognizable for people is displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be hereinafter explained with reference to FIGS. 1 to 3.

In this embodiment, an example of the structure of a liquid crystal projector including four transmissive liquid crystal light valves is explained.

Figure 1:
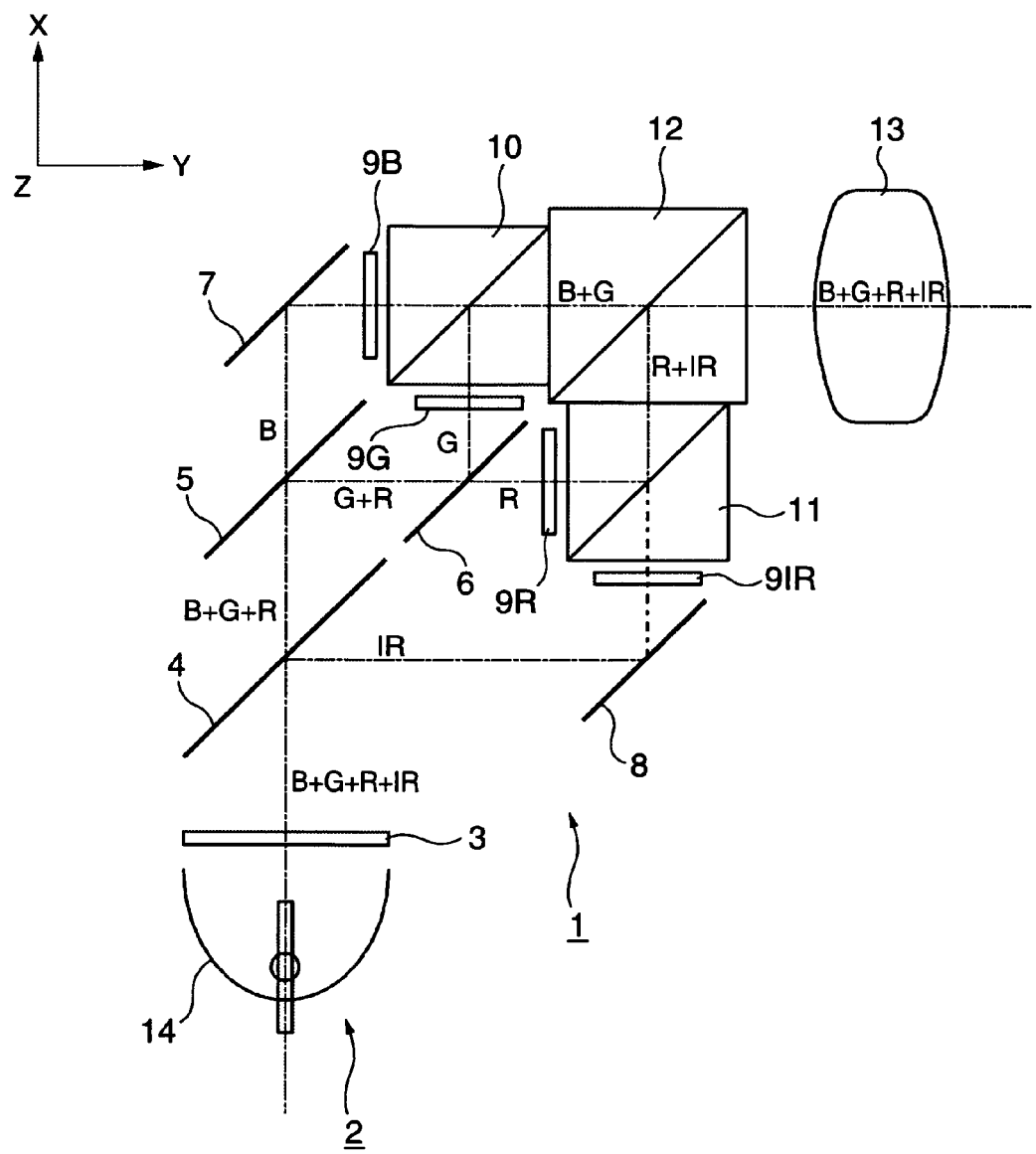
FIG. 1 is a schematic diagram of a projector according to a first embodiment of the invention.

FIG. 1 is a schematic diagram of a projector according to this embodiment. FIGS. 2A to 2F are diagrams showing spectral characteristics of dichroic mirrors (dichroic prisms) used in the projector. FIG. 3 is an enlarged diagram of the periphery of a liquid crystal light valve used in the projector.

In the respective drawings referred to below, to make it easy to see respective components, dimensions and scales of positional relations are varied for the respective components.

A projector 1 according to this embodiment roughly includes, as shown in FIG. 1, a light source 2, an ultraviolet cut filter 3, dichroic mirrors 4, 5, and 6 (light separating means), reflection mirrors 7 and 8, liquid crystal light valves 9R, 9G, and 9B (light modulation elements for visible light), a liquid crystal light valve 9IR (a light modulation element for infrared light), dichroic prisms 10, 11, and 12 (light combining means), and a projection lens 13 (projecting means). The light source 2 is a light source that can emits light including visible light and infrared light. Specifically, a lamp that emits light including white light and infrared light such as a high pressure mercury lamp, a metal halide lamp, a xenon lamp, or a halogen lamp can be used. Illumination light emitted from the lamp is condensed by a reflector 14 and made incident on the ultraviolet cut filter 3. Unnecessary ultraviolet light is removed by the ultraviolet cut filter 3.

Figure 2A:
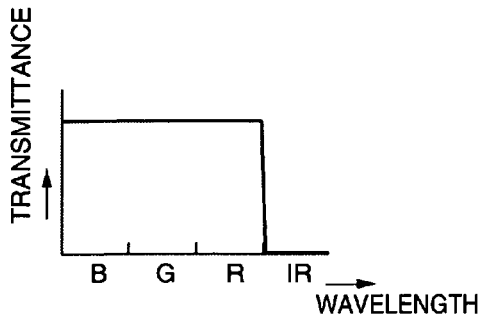
FIGS. 2A to 2F are diagram showing spectral characteristics of dichroic mirrors (dichroic prisms) used in the projector.
Figure 2D:
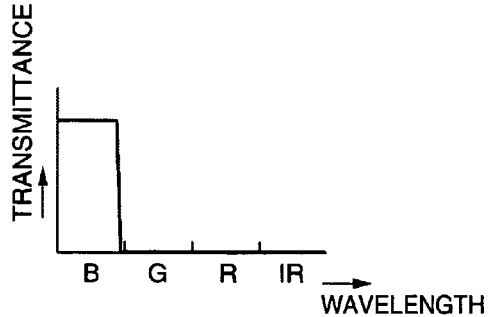
Figure 2B:
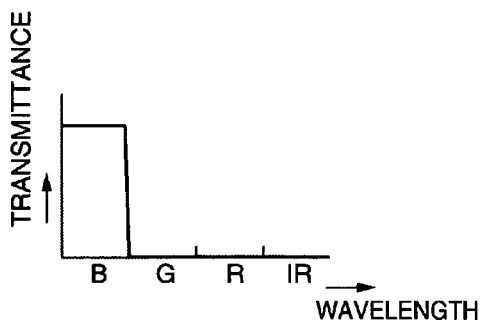

Light emitted from the ultraviolet cut filter 3 is made incident on the dichroic mirror 4. The dichroic mirror 4 has a spectral characteristic of, as shown in FIG. 2A, transmitting blue light (B light), green light (G light), and red light (R light) and reflecting infrared light (IR light). Therefore, the blue light, the green light, and the red light are transmitted through the dichroic mirror 4 and the infrared light is reflected by the dichroic mirror 4. The blue light, the green light, and the red light transmitted through the dichroic mirror 4 are made incident on the dichroic mirror 5. The dichroic mirror 5 has a spectral characteristic of, as shown in FIG. 2B, transmitting the blue light and reflecting the green light, the red light, and the infrared light. Therefore, the blue light is transmitted through the dichroic mirror 5 and the green light and the red light are reflected by the dichroic mirror 5. The blue light transmitted through the dichroic mirror 5 is made incident on the liquid crystal light valve for blue light 9B through the reflection mirror 7.

It is assumed, as an example, the blue light is light in a wavelength region of about 380 nm to 495 nm, the green light is light in a wavelength region of about 495 nm to 585 nm, the red light is light in a wavelength region of about 585 nm to 720 nm, and the infrared light is light in a wavelength region of about 720 nm to 1100 nm. It is said that a visible wavelength region of human is, in general, 380 nm to 780 nm. However, actually, human hardly has any visibility in a wavelength region equal to or larger than 720 nm. A sensitivity limit of an Si photosensor, which is the mainstream of imaging device, is about 1100 nm.

Figure 2E:
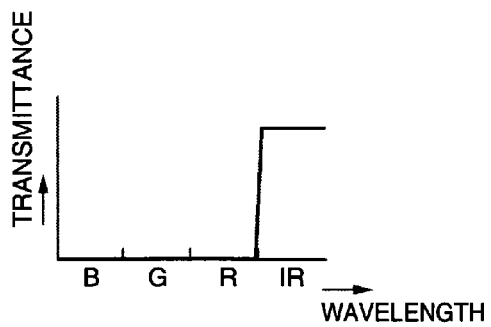
Figure 2C:
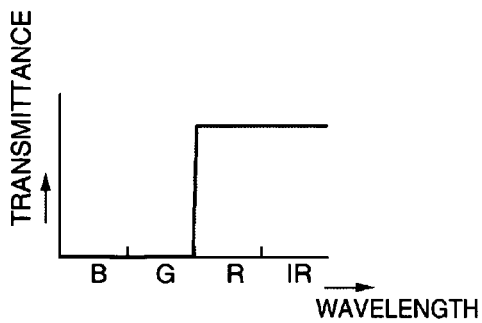

On the other hand, the green light and the red light reflected by the dichroic mirror 5 are made incident on the dichroic mirror 6. The dichroic mirror 6 has a spectral characteristic of, as shown in FIG. 2C, transmitting the red light and the infrared light and reflecting the blue light and the green light. Therefore, the red light is transmitted through the dichroic mirror 6 and the green light is reflected by the dichroic mirror 6. The red light transmitted through the dichroic mirror 6 is made incident on the liquid crystal light valve for red light 9R. The green light reflected by the dichroic mirror 6 is made incident on the liquid crystal light valve for green light 9G. After being modulated by the liquid crystal light valves for the respective color lights 9R, 9G, and 9B on the basis of information from the outside, the respective color lights of R, G, and B are emitted to the dichroic prisms 10 and 11 as color lights including image information.

The infrared light reflected by the dichroic mirror 4 is made incident on the liquid crystal light valve for infrared light 9IR through the reflection mirror 8. After being modulated by the liquid crystal light valve for infrared light 9IR on the basis of information from the outside, the infrared light is emitted to the dichroic prism 11 as infrared light including image information.

Although not shown in the figure, a pair of polarizers are arranged on a light incidence side and a light exiting side of each of the liquid crystal light valves 9R, 9G, 9B, and 9IR. The polarizers control a polarization state of light passing through the transmissive liquid crystal light valve, convert phase information of modulated light into intensity information, and form a display image. In particular, in the liquid crystal light valve 9IR that modulates the infrared light, a light reflective polarizer with less light absorption (which is, in this case, limited to the light incidence side) or a light absorptive polarizer containing metal particles excellent in heat resistance (which is, in this case, can be set on both the light incidence side and the light exiting side). Consequently, it is possible to prevent deterioration of the polarizers and the liquid crystal light valves and realize image formation with high contrast. Specifically, as the light reflective polarizer, a wire grid polarizer in which metal wires are periodically arrayed at a fine pitch and a DBFE plate (product name: Sumitomo 3M Limited) in which two kinds of transparent materials with different birefringences are periodically stacked at a fine pitch can be used. As the light absorptive polarizer, for example, Polarcor (product name: Corning Incorporated) in which metal particles having shape anisotropy are oriented can be used.

Figure 2F:
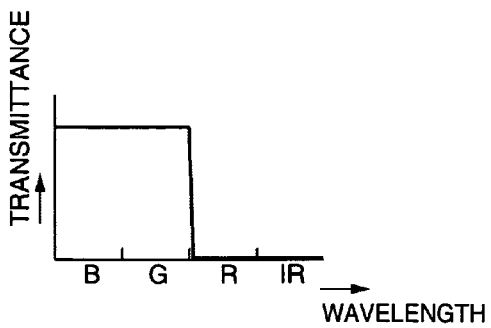

The modulated lights emitted from the respective liquid crystal light valves 9R, 9G, 9B, and 9IR are sequentially combined by the dichroic prisms 10, 11, and 12. The dichroic prism 10 (a dichroic mirror in the dichroic prism 10) has a spectral characteristic of, as shown in FIG. 2D, transmitting the blue light and reflecting the green light, the red light, and the infrared light. Therefore, the blue light is transmitted through and the green light is reflected by the dichroic prism 10, whereby the blue light and the green light are combined. The dichroic prism 11 (a dichroic mirror in the dichroic prism 11) has a spectral characteristic of, as shown in FIG. 2E, transmitting the infrared light and reflecting the blue light, the green light, and the red light. Therefore, the infrared light is transmitted through and the red light is reflected by the dichroic prism 11, whereby the red light and the infrared light are combined. The dichroic prism 12 (a dichroic mirror in the dichroic prism 12) has a spectral characteristic of, as shown in FIG. 2F, transmitting the blue light and the green light and reflecting the red light and the infrared light. Therefore, the blue light and the green light are transmitted through and the red light and the infrared light are reflected by the dichroic prism 12, whereby all the modulated lights are combined into one light.

The modulated lights combined in this way are changed to one projected light and projected on a not-shown screen by the projection lens 13. The respective color lights emitted from the liquid crystal light valve for blue light 9B, the liquid crystal light valve for green light 9G, and the liquid crystal light valve for red light 9R are combined into one light and forms a visible color image. The infrared light emitted from the liquid crystal light valve for infrared light 9IR independently forms an invisible infrared image. Therefore, the visible color image and the invisible infrared image are superimposed (laid one on top of the other) to be one image and displayed on the screen.

A prism-type dichroic element is an optical element in which a dichroic film is nipped and held by prisms made of a glass material or plastic resin optically transparent in a visible region and an infrared region. When such an optical element made of a medium having a refractive index higher than that of the air is arranged in an optical path, an optical path length can be reduced according to the refractive index compared with the case in which the optical element is not arranged. In other words, optical path lengths between the liquid crystal light valves 9R, 9G, 9B, and 9IR and the projection lens 13 can be reduced compared with the case in which a mirror-type dichroic element is used. Therefore, it is easy to realize a reduction in size and cost of the projection lens 13 and an increase in luminance according to improvement in light usage efficiency realized by reducing an F value of the projection lens 13.

Since the glass material and the plastic resin have wavelength dependency in refractive indexes thereof, in a dichroic prism made of any one of these materials, an optical path length between the dichroic prism and a projection lens is slightly different depending on a wavelength. Similarly, in a projection lens made of any one of these materials, a focal distance (a focus position) is different depending on a wavelength. As a result, defocusing and the fall in resolution of a display image, bleeding of colors, and the like occur to cause deterioration in an image quality.

Figure 3:
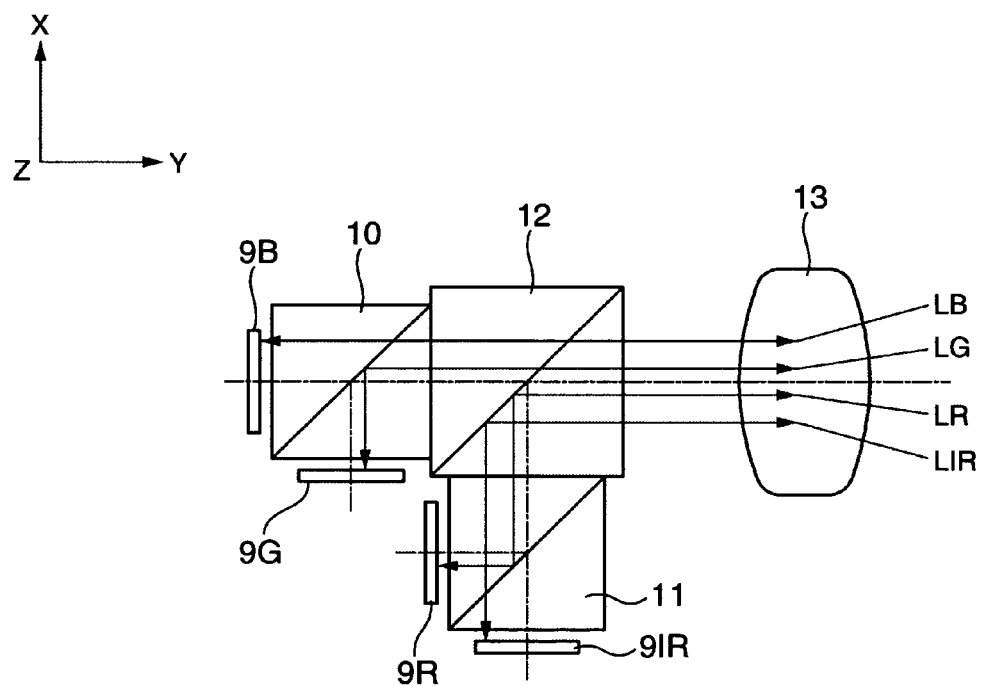
FIG. 3 is an enlarged diagram of the periphery of a liquid crystal light valve used in the projector.

Therefore, in the projector according to this embodiment, as shown in FIG. 3, it is desirable that (physical) distances LR, LG, and LB between the projection lens 13 and the liquid crystal light valves for visible lights (the liquid crystal light valve for red light 9R, the liquid crystal light valve for green light 9G, and the liquid crystal light valve for blue light 9B) and a (physical) distance LIR between the projection lens 13 and the liquid crystal light valve for infrared light 9IR are set different (specifically, LR=LG=LB<LIR). In particular, as described above, the wavelength of about 720 nm to 1100 nm is assumed for the infrared light and a range of the wavelength is wide compared with those of the visible lights, the blue light, the green light, and the red light. Thus, an influence of deterioration in an image quality due to the infrared light is large compared with those of the visible lights. Therefore, by setting the (physical) distance LIR between the projection lens 13 and the liquid crystal light valve for infrared light 9IR different (specifically, LR=LG=LB<LIR), it is possible to reduce the deterioration in an image quality while keeping easiness of assembly with the distances between the projection lens 13 and the liquid crystal light valves for the respective color lights 9R, 9G, and 9B set substantially identical. Alternatively, among the liquid crystal light valves for visible lights, the (physical) distances LB, LG, and LR between the projection lens 13 and the liquid crystal light valves for the respective color lights 9R, 9G, and 9B may be set different from one another (specifically, LB<LG<LR<LIR). In other words, distances between the projection lens 13 and the liquid crystal light valves 9R, 9G, 9B, and 9IR corresponding to lights in a long wavelength region may be set longer than those in a short wavelength region. Then, since it is necessary to set the distances between all the liquid crystal light valves 9R, 9G, 9B, and 9IR and the projection lens 13 different, although difficulty in assembly increases, it is possible to further prevent the deterioration in an image quality by setting optical lengths depending on wavelength identical.

Other than setting the (physical) distances between the projection lens 13 and the liquid crystal light valves 9R, 9G, 9B, and 9IR different, for example, a method of using a medium having a large Abbe number (small wavelength dependency of a refractive index) for the dichroic prism 10, 11, and 12 and the projection lens 13 and a method of using an anomalous dispersion material having unusual wavelength dependency of a refractive index are also effective.

The liquid crystal light valve for infrared light 9IR that modulates infrared light is a liquid crystal light valve identical with the other liquid crystal light valves 9R, 9G, and 9B that modulate visible lights. Dimensions of respective sections, resolution, the number of pixels, and the like of the liquid crystal light valve for infrared light 9IR are set identical with those of the other liquid crystal light valves 9R, 9G, and 9B. Consequently, it is possible to form one image in which a visible color image and an invisible infrared image are completely superimposed (laid one on top of the other) at a pixel level is formed on the screen. It is possible to finely control displayed information at a level of local data (in pixel units) in the image. With this structure, there is also an advantage that it is unnecessary to prepare plural kinds of liquid crystal light valves having different specifications and cost of the apparatus is easily reduced.

Since a liquid crystal material used in the liquid crystal light valves 9R, 9G, 9B and 9IR has wavelength dependency in an electro-optic effect, it is desirable to realize improvement in an image quality of a formed image by changing the liquid crystal material according to a wavelength of light to be modulated or changing the thickness of a liquid crystal cell. When it is unnecessary to set controllability of displayed information identical in the visible color image and the invisible infrared image and fine controllability in pixel units is unnecessary, a liquid crystal light valve having dimensions, resolution, the number of pixels, and the like different from those of the liquid crystal light valves 9R, 9G, and 9B that form color images may be used as the liquid crystal light valve 9IR for infrared image formation.

The projector 1 according to this embodiment has a function of displaying a marker formed by a visible image, which indicates that an infrared image is presently displayed, in an unnoticeable place such as a peripheral part of a visible image in a period in which the infrared image is displayed. Consequently, a user and a viewer of the projector can easily discriminate, without using an imaging device such as a camera, whether an infrared image visually unrecognizable for people is displayed. Alternatively, for example, an indicator or the like, which indicates that an infrared image is displayed, may be set in a projector main body instead of displaying the marker formed by the visible image.

An infrared image is visually unrecognizable for people but can be seen through a camera mounted with an imaging device such as a CCD or a CMOS sensor, an infrared camera, and the like. Therefore, when rough information are displayed as visible image and detailed information related to the images is displayed as an infrared image, both securing of an information amount and visibility can be realized. When the information in the infrared image is associated with information for accessing an information source on a network (e.g., a URL and an IP address), it is possible to easily obtain detailed information simply by imaging the infrared image using a portable terminal with a camera connectable to the network.

When this type of use is assumed, in the projector 1 according to this embodiment, a color visible image and an invisible infrared image can be superimposed and displayed in pixel units. Therefore, fine association for both the images and display control are possible. Further, in the projector 1 according to this embodiment, wavelengths are separated to prevent a wavelength region of visible light and a wavelength region of infrared light from overlapping. Therefore, when a camera including optical filters corresponding to cutoff wavelengths of both the lights is used, the visible image and the infrared image can be accurately separated and it is possible to selectively read only one image.

As described above, with the projector 1 according to this embodiment, it is possible to independently control display states of a color visible image and an invisible infrared image, display both the images on one screen in an accurately superimposed state, and control displayed information (images and videos). Since superimposition and display of the visible image and the infrared image can be performed with one projector, even when the projector is moved, work for adjusting display positions of the visible image and the infrared image to each other is unnecessary. Therefore, the projector is excellent in usability. Further, since an entire display system can be reduced in size, the projector is excellent in portability.

Second Embodiment

A second embodiment of the invention will be hereinafter explained with reference to FIG. 4.

The basic structure of a projector according to this embodiment is substantially the same as that of the projector according to the first embodiment. However, the projector according to this embodiment is different from the projector according to the first embodiment in that a light source for infrared light is provided independently from a white light source for visible light.

Figure 4:
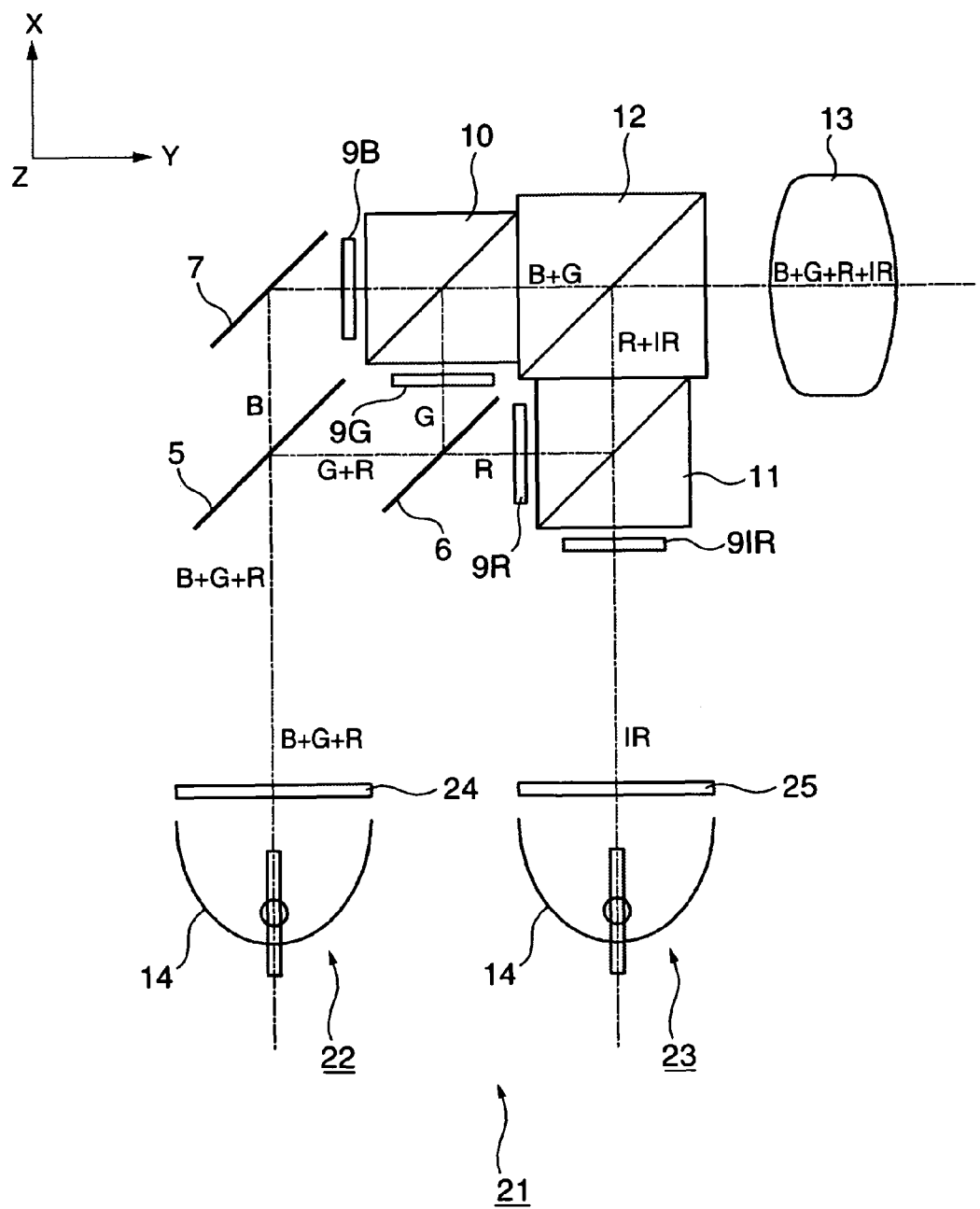
FIG. 4 is a schematic diagram of a projector according to a second embodiment of the invention.

FIG. 4 is a schematic diagram of the projector according to this embodiment. In FIG. 4, components same as those shown in FIG. 1 referred to in the first embodiment are denoted by the same reference numerals and signs and detailed explanation of the components are omitted.

Most of discharge-type light sources such as a high pressure mercury lamp and a metal halide lamp radiate infrared light together with visible light. However, in general, it is difficult to obtain infrared light with high intensity (although infrared light with relatively high intensity can be obtained by a xenon lamp and a halogen lamp, an intensity balance of lights of three primary colors forming white light is bad). Imaging devices such as a CCD and a CMOS sensor have sensitivity covering an infrared region (Imaging devices such as a CCD and a CMOS sensor have sensitivity to about 1100 nm). However, in general, the sensitivity substantially falls in a wavelength region exceeding 800 nm. Moreover, infrared light is often included in ambient light. Therefore, it is necessary to increase display luminance of an infrared image in order to clearly display the infrared image and make it possible to easily image the infrared image with the imaging devices.

Therefore, a projector 21 according to this embodiment includes, as shown in FIG. 4, a light source for infrared light 23 independently from a light source for visible light 22. For example, a high pressure mercury lamp, a metal halide lamp, and the like can be used for the light source for visible light 22 and a xenon lamp, a halogen lamp, and the like can be used for the light source for infrared light 23. Alternatively, solid-state light sources such as an infrared light emitting diode (LED) and an infrared laser can be used instead of the xenon lamp and the halogen lamp. It is possible to make it easy to increase intensity of infrared light by providing the light source for visible light 22 and the light source for infrared light 23 separately from each other in this way.

When necessary, an ultraviolet/infrared cut filter 24 is arranged on a light exiting side of the light source for visible light 22 and an ultraviolet/visible light cut filter 25 is arranged on a light exiting side of the light source for infrared light 23. It goes without saying that, when the light sources 22 and 23 do not emit lights in wavelength regions to be removed, respectively, light cut filters corresponding to the light sources 22 and 23 are unnecessary. This is for the purpose of surely making only lights in wavelength regions corresponding to respective liquid crystal light valves incident, improving controllability of displayed information (images and videos) in a visible image and an infrared image, realizing improvement in an image quality through improvement in color purity, and making it easy to optimize specifications of each of the liquid crystal light valves according to incident light.

Light emitted from the light source for visible light 22 is changed to visible light obtained by removing unnecessary ultraviolet light and infrared light with the ultraviolet/infrared cut filter 24. After being separated into blue light, green light, and red light by the dichroic mirrors 5 and 6, the light is made incident on the liquid crystal light valves for the respective color lights 9R, 9G, and 9B corresponding to the lights. On the other hand, light emitted from the light source for infrared light 23 is changed to infrared light obtained by removing unnecessary ultraviolet light and visible light with the ultraviolet/visible light cut filter 25 and is made incident on the liquid crystal light valve for infrared light 9IR corresponding to the infrared light. The respective liquid crystal light valves 9R, 9G, 9B, and 9IR modulate the lights on the basis of information from the outside and emit the lights as lights including image information. Other components and actions are the same as those in the first embodiment.

With the projector 21 according to this embodiment, it is possible to obtain effects same as those in the first embodiment, i.e., it is possible to accurately superimpose a color visible image and an invisible infrared image on one screen, work for adjusting display positions of the visible image and the infrared image to each other is unnecessary, the projector is excellent in usability, and, since a display system can be reduced in size, the projector is excellent in portability.

In this embodiment, since the light source for infrared light 23 is independently provided, it is easy to increase intensity of infrared light and it is possible to obtain a clear infrared image. Since the infrared light is usually present under a normal environment of use such as the afternoon sun, depending on an environment of use of the projector, in some case, it is likely that luminance of an infrared image is relatively low compared with that of ambient infrared light and desired infrared display cannot be realized. In such a case, the structure according to this embodiment is suitable.

Third Embodiment

A third embodiment of the invention will be hereinafter explained with reference to FIG. 5.

A projector according to this embodiment includes, unlike the projectors according to the first and second embodiments, four light sources having light emission wavelength regions different from one another.

Figure 5:
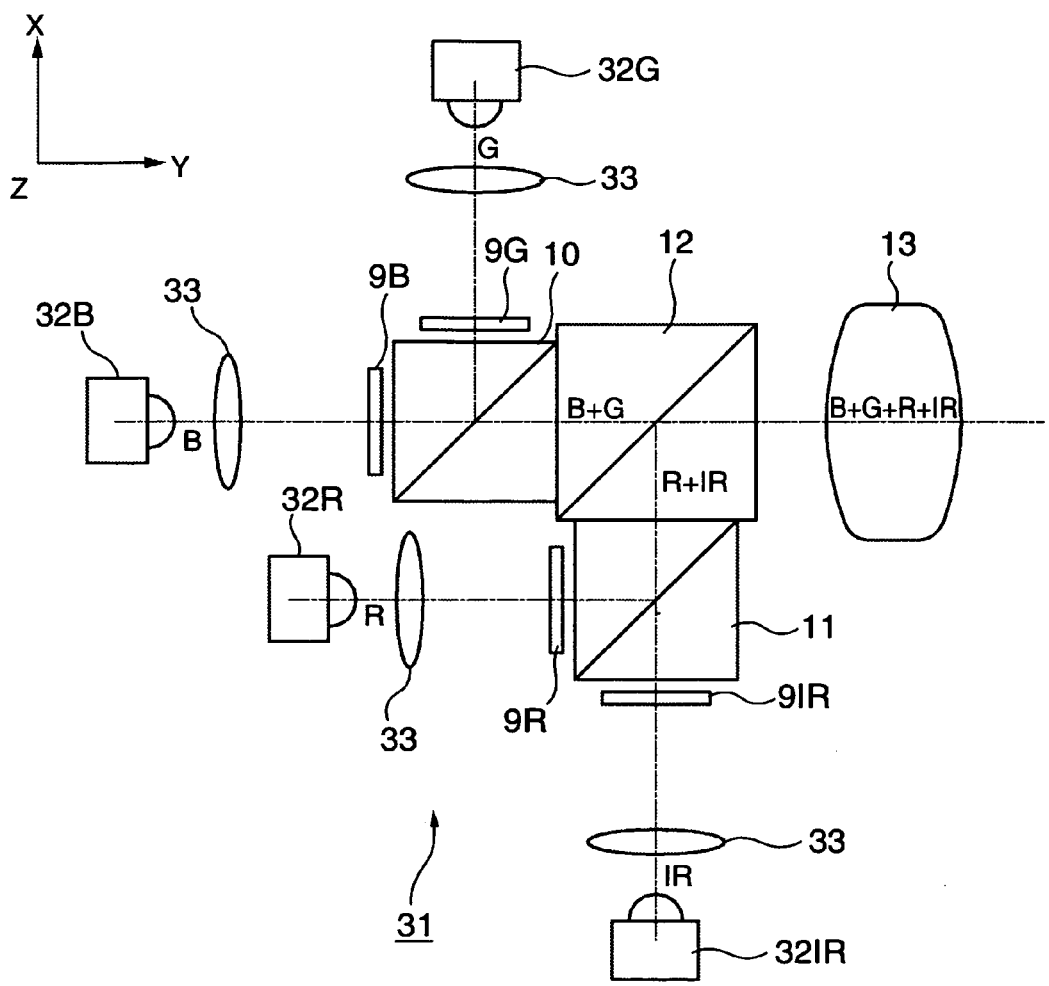
FIG. 5 is a schematic diagram of a projector according to a third embodiment of the invention.

FIG. 5 is a schematic diagram of the projector according to this embodiment. In FIG. 5, components same as those shown in FIGS. 1 and 4 referred to in the first embodiment are denoted by the same reference numerals and signs and detailed explanation of the components are omitted.

A projector 31 according to this embodiment includes, as shown in FIG. 5, a light source for blue light 32B that emits blue light, a light source for green light 32G that emits green light, a light source for red light 32R that emits red light, and a light source for infrared light 32IR that emits infrared light. Solid-state light sources such as an LED, a laser, an EL (Electro-Luminescence) element, and an FED (Field Emission Display) element can be used for these light sources 32B, 32G, 32R, and 32IR. Lights emitted from the respective light sources 32B, 32G, 32R, and 32IR are changed to substantially parallel lights by a collimate lens 33, made incident on the liquid crystal light valves 9R, 9G, 9B, and 9IR corresponding to the lights, and modulated. When necessary, light in an unnecessary wavelength region may be removed from the lights emitted from the respective light sources 9R, 9G, 9B, and 9IR using optical filters.

With the projector 31 according to this embodiment, it is possible to obtain effects same as those in the first and second embodiments, i.e., it is possible to accurately superimpose a color visible image and an invisible infrared image on one screen, work for adjusting display positions of the visible image and the infrared image to each other is unnecessary, the projector is excellent in usability, and, since a display system can be reduced in size, the projector is excellent in portability.

In particular, in this embodiment, since the four light sources 32B, 32G, 32R, and 32IR having light emission wavelength regions not overlapping each other are used, it is unnecessary to use light separating means including a dichroic mirror and the like and it is possible to simplify an optical system. Since the independent light source for infrared light 32IR can be adopted, it is easy to realize an increase in luminance of an infrared image.

Fourth Embodiment

A fourth embodiment of the invention will be hereinafter explained with reference to FIG. 6 to FIGS. 8A to 8D.

The basic structure of a projector according to this embodiment is substantially the same as that of the projector according to the first embodiment. However, the projector according to this embodiment is different from the projector according to the first embodiment in that two infrared images are independently displayed in association with two infrared lights in different wavelength regions.

Figure 6:
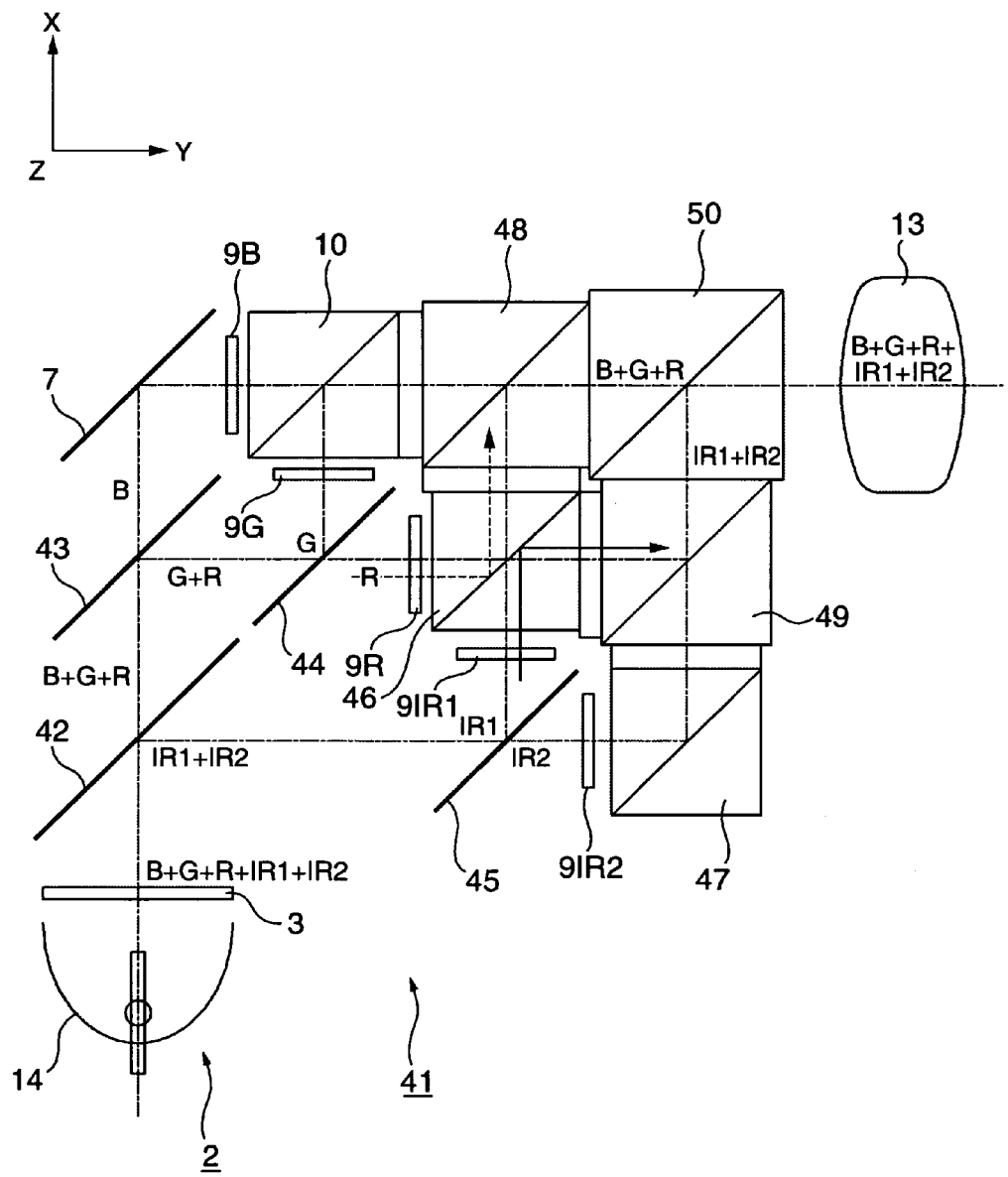
FIG. 6 is a schematic diagram of a projector according to a fourth embodiment of the invention.

FIG. 6 is a schematic diagram of the projector according to this embodiment. FIGS. 7A to 7D and FIGS. 8A to 8D are diagrams showing spectral characteristics of dichroic mirrors and dichroic prisms used in the projector. In FIG. 6, components same as those shown in FIG. 1 referred to in the first embodiment are denoted by the same reference numerals and signs and detailed explanation of the components are omitted.

Figure 7A:
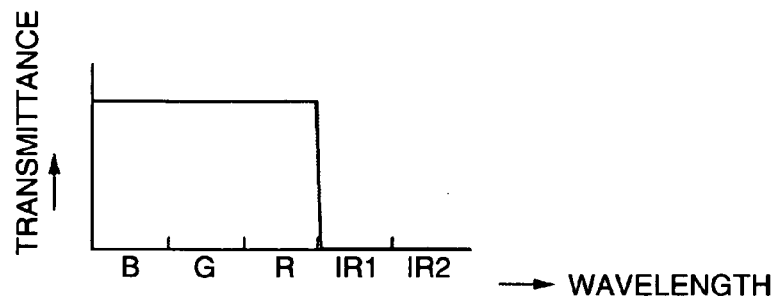
FIGS. 7A to 7D are diagrams showing spectral characteristics of dichroic mirrors used in the projector.
Figure 7B:
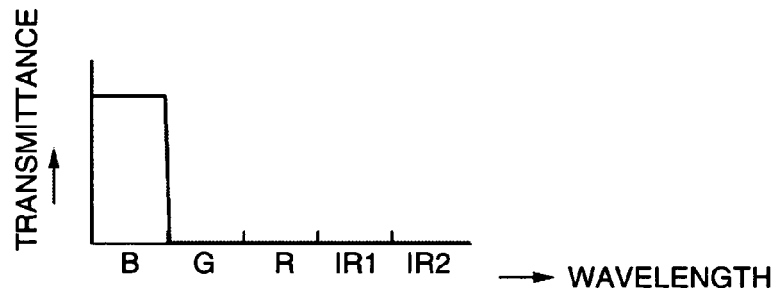
Figure 7C:
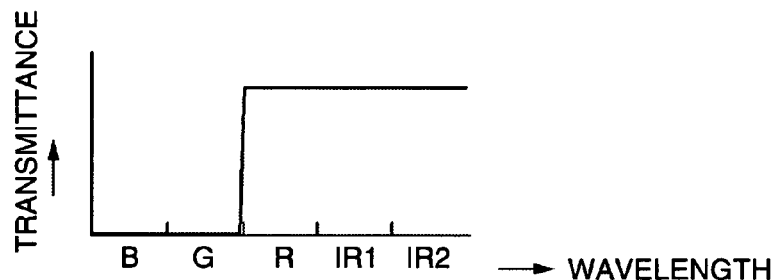

In the first embodiment, light emitted from the light source is separated by the dichroic mirror that transmits blue light, green light, and red light and reflects infrared light. On the other hand, in a projector 41 according to this embodiment, as shown in FIG. 6, light emitted from the light source 2 is separated by a dichroic mirror 42 (a spectral characteristic of which is shown in FIG. 7A) that transmits blue light, green light, and red light and reflects two infrared lights (hereinafter, for convenience of explanation, referred to as IR1 light and IR2 light) in different wavelength regions in an infrared region. In other words, the light emitted from the light source 2 is separated into visible light and infrared lights by the dichroic mirror 42. Thereafter, the visible light is treated in the same manner as the first embodiment. Spectral characteristics of the dichroic mirrors 43 and 44 are shown in FIGS. 7B and 7C. The spectral characteristics are basically the same as the spectral characteristics of the dichroic mirrors 5 and 6 shown in FIGS. 2B and 2C.

Figure 7D:

On the other hand, the infrared lights reflected by the dichroic mirror 42 are made incident on a dichroic mirror 45. The dichroic mirror 45 has a spectral characteristic of, as shown in FIG. 7D, reflecting the IR1 light and transmitting the IR2 light. Therefore, the IR1 light is reflected by the dichroic mirror 45 and made incident on a liquid crystal light valve for IR1 light 9IR1. On the other hand, the IR2 light is transmitted through the dichroic mirror 45 and made incident on a liquid crystal light valve for IR2 light 9IR2. After being modulated by the respective liquid crystal light valves 9IR1 and 9IR2 on the basis of information from the outside, the respective infrared lights IR1 and IR2 are emitted to a both-side reflection prism 46 and a reflection prism 47, respectively, as infrared lights including image information.

Figure 8A:
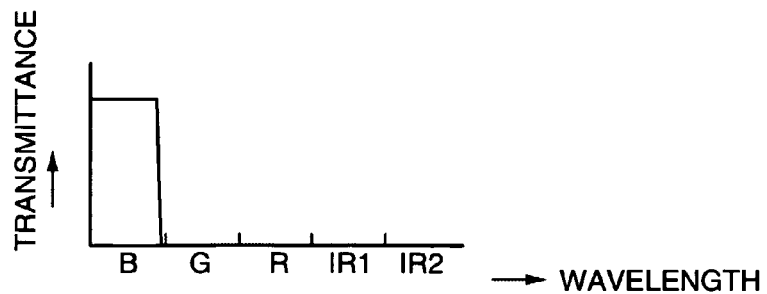
FIGS. 8A to 8D are diagrams showing spectral characteristics of dichroic prisms used in the projector.
Figure 8B:
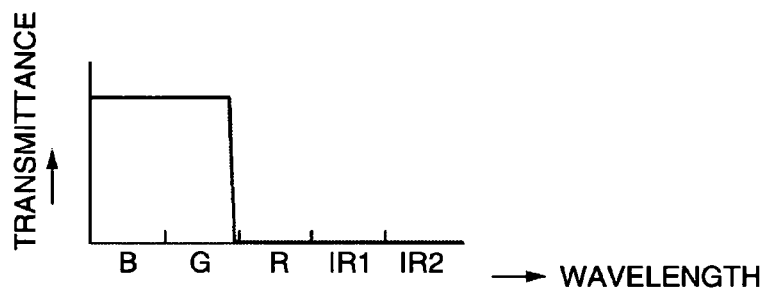

Light reflected by the liquid crystal light valve for red light 9R is reflected by the both-side reflection prism 46 and made incident on a dichroic prism 48. Combined light obtained by combining the blue light and the green light with the dichroic prism 10, a spectral characteristic of which is shown in FIG. 8A, is also made incident on the dichroic prism 48. The dichroic prism 48 has a spectral characteristic of, as shown in FIG. 8B, transmitting the blue light and the green light and reflecting the red light. Therefore, the combined light of the blue light and the green light and the red light are combined by the dichroic prism 48 and modulated visible light is generated.

Figure 8C:

The IR1 light after modulation reflected by the both-side reflection prism 46 and the IR2 light after modulation reflected by the reflection prism 47 are made incident on a dichroic prism 49. The dichroic prism 49 has a spectral characteristic of, as shown in FIG. 8C, reflecting the IR1 light and transmitting the IR2 light. Therefore, the IR1 light and the IR2 light are combined by the dichroic prism 49 and modulated infrared light is generated.

Figure 8D:
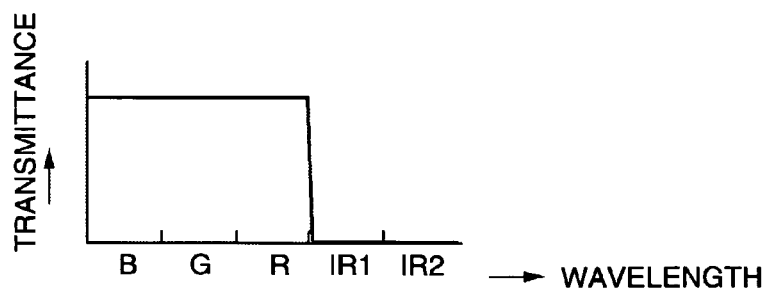

The visible light after modulation and the infrared light after modulation are made incident on a dichroic prism 50. The dichroic prism 50 has a spectral characteristic of, as shown in FIG. 8D, transmitting the visible lights (the blue light, the green light, and the red light) and reflecting the infrared lights (the IR1 light and the IR2 light). Therefore, the visible light and the infrared light are combined by the dichroic prism 50, the combined image is made incident on the projection lens 13 and projected on the screen by the projection lens 13.

With the projector 41 according to this embodiment, it is possible to obtain effects same as those in the first to third embodiments, i.e., it is possible to accurately superimpose a color visible image and an invisible infrared image on one screen, work for adjusting display positions of the visible image and the infrared image to each other is unnecessary, the projector is excellent in usability, and, since a display system can be reduced in size, the projector is excellent in portability.

In particular, in this embodiment, since two kinds of infrared images can be independently displayed, various kinds of control for displayed information are possible. For example, when a translated sentence of a sentence displayed as a visible image is displayed in two kinds of languages, the translated sentence is displayed as infrared images in different wavelength regions for the respective languages. Then, an appreciator can acquire only a necessary translated sentence. Therefore, it is possible to realize both securing of an information amount and visibility. It goes without saying that, from the same viewpoint, the infrared light may be separated into three or more infrared lights in different wavelength regions to make it possible to modulate the infrared lights independently from one another.

Fifth Embodiment

A fifth embodiment of the invention will be hereinafter explained with reference to FIG. 9 and FIGS. 10A to 10D.

In the embodiments described above, the examples of the projector including the transmissive light modulation element (the transmissive liquid crystal light valve) are explained. In this embodiment, an example of a projector including a reflective light modulation element (a reflective liquid crystal light valve) is explained.

Figure 9:
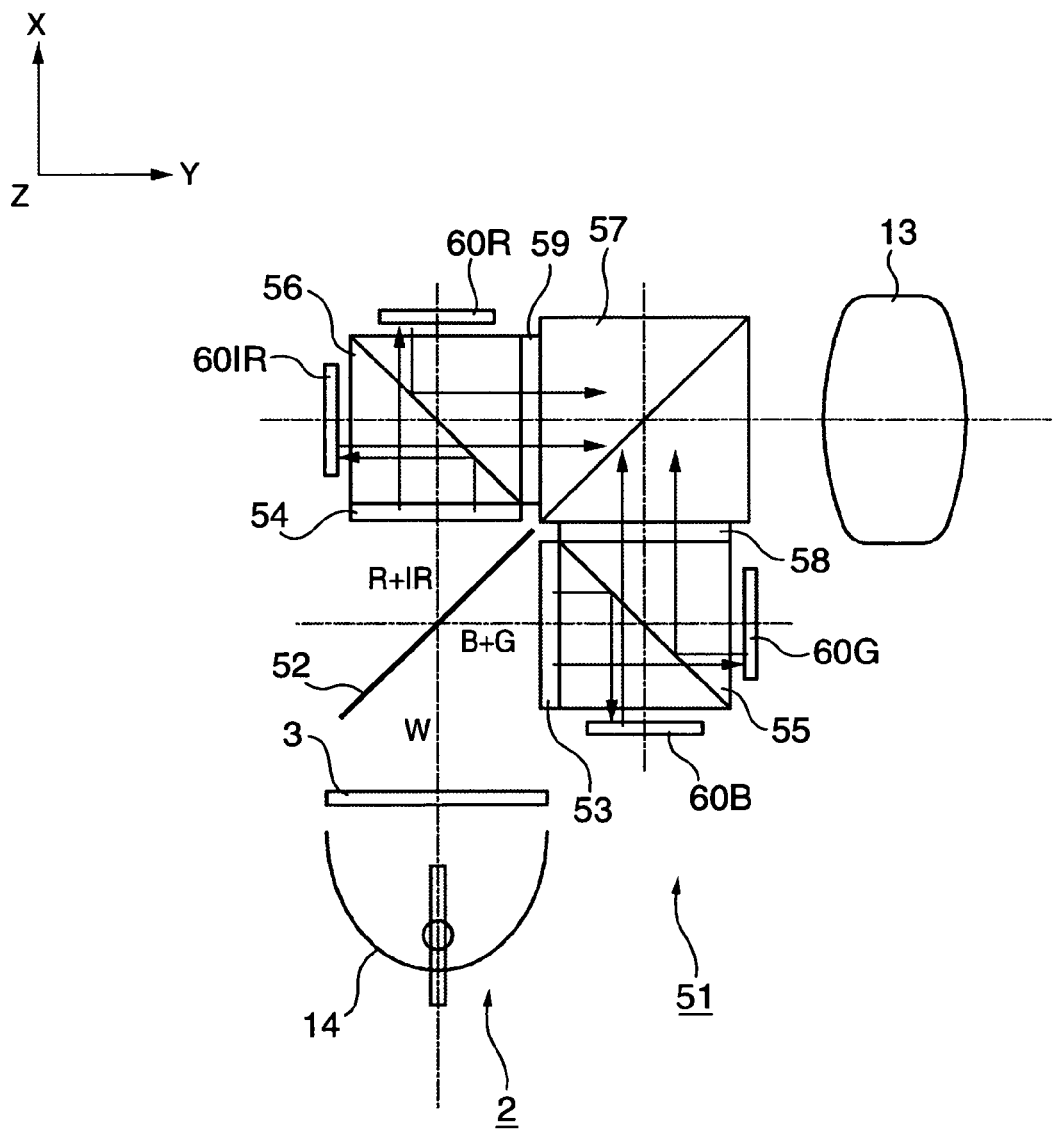
FIG. 9 is a schematic diagram of a projector according to a fifth embodiment of the invention.

FIG. 9 is a schematic diagram of a projector according to this embodiment. FIGS. 10A to 10D are diagrams showing spectral characteristics of dichroic mirrors (dichroic prisms) and polarized beam splitter (hereinafter abbreviated as PBS) prisms used in the projector. In FIG. 9, components same as those shown in FIG. 1 are denoted by the same reference numerals and signs and detailed explanation of the components is omitted.

Figure 10A:
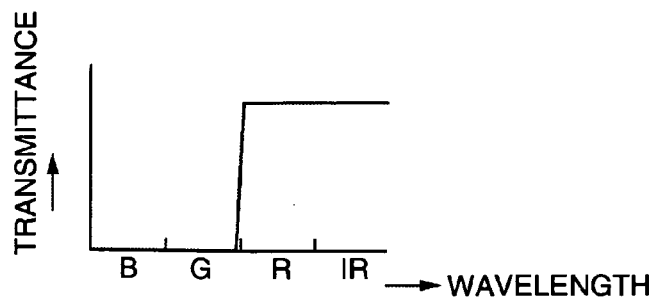
FIGS. 10A to 10D are diagrams showing spectral characteristics of dichroic mirrors, dichroic prisms, and PBS prisms used in the projector.

A projector 51 according to this embodiment roughly includes, as shown in FIG. 9, the light source 2, the ultraviolet cut filter 3, a dichroic mirror 52 (light separating means), wavelength selecting retarder elements 53 and 54, reflective liquid crystal light valves 60R, 60G, and 60B (spatial light modulation elements for visible light), a reflective liquid crystal light valve 60IR (a spatial light modulation element for infrared light), PBS prisms 55 and 56 (light combining means), a dichroic prism 57 (light combining means), and the projection lens 13 (projecting means). After unnecessary ultraviolet light is removed by the ultraviolet cut filter 3, illumination light emitted from the light source 2, which mainly radiates visible light and infrared light, is separated into combined light (reflected) of the blue light and the green light and combined light (transmitted) of the red light and the infrared light by the dichroic mirror 52, a spectral characteristic of which is shown in FIG. 10A.

After being converted into specific polarized light (e.g., P polarized light) by a not-shown sheet polarizer, the combined light of the blue light and the green light is made incident on the wavelength selecting retarder element 53. A polarization direction of the blue light is rotated 90 degrees by the wavelength selecting retarder element 53. The polarized light is changed to S polarized light and emitted. At this point, since the green light is not subjected to a polarized light rotating action, the green light is emitted as the P polarized light. The two color lights, polarization states of which are converted by the wavelength selecting retarder element 53 according to wavelength regions, is made incident on the PBS prism 55, a spectral characteristic of which is shown in FIG. 10C, separated according to the polarization states, and made incident on the reflective liquid crystal light valves corresponding thereto (the liquid crystal light valve for blue light 60B and the liquid crystal light valve for green light 60G). The respective liquid crystal light valves 60B and 60G convert the polarization states of the lights (e.g., from the P polarized light to the S polarized light or from the S polarized light to the P polarized light) on the basis of information from the outside to include image information in the lights. Therefore, the S polarized light made incident on the liquid crystal light valve for blue light 60B is partially converted into the P polarized light according to the image information and emitted. On the other hand, the P polarized light made incident on the liquid crystal light valve for green light 60G is partially converted in the S polarized light according to the image information and emitted. The color lights emitted from the respective liquid crystal light valves 60B and 60G are made incident on the PBS prism 55 again and selectively separated according to polarization states. Only the color light having a polarization state corresponding to the image information is emitted to the dichroic prism 57.

Figure 10B:
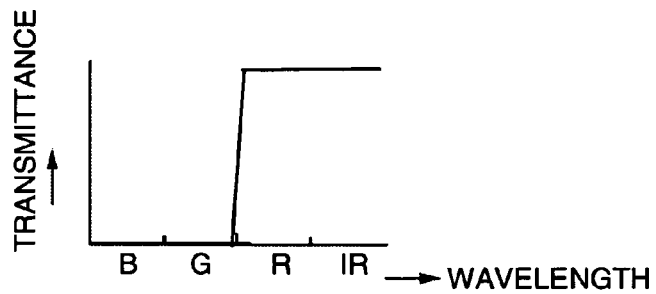
Figure 10C:
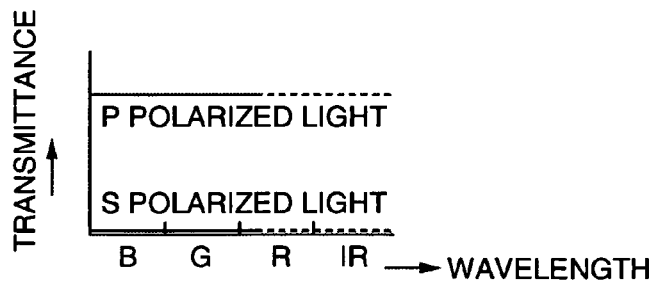
Figure 10D:
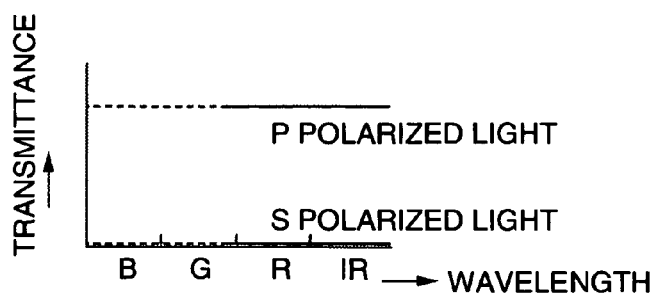

Similarly, the combined light of the red light and the infrared light is made incident on the dichroic prism 57 through the wavelength selecting retarder element 54, the PBS prism 56, a spectral characteristic of which is shown in FIG. 10D, the two liquid crystal light valves 60R and 60IR corresponding to the lights, and the PBS prism 56. Spacers 58 and 59 are inserted between the PBS prisms 55 and 56 and the dichroic prism 57, respectively. The spacers 58 and 59 are used for making it easy to arrange the PBS prisms 55 and 56, the wavelength selecting retarder elements 53 and 54, and the like with respect to the dichroic prism 57. Therefore, it is not essential to use the spacers 58 and 59.

The respective modulated light including the image information emitted from the four liquid crystal light valves 60B, 60G, 60R, and 60IR are combined by the dichroic prism 57, a spectral characteristic of which is shown in FIG. 10B, to be one projected light and projected on the screen by the projection lens 13.

With the projector 51 according to this embodiment, it is possible to obtain effects same as those in the first to fourth embodiments, i.e., it is possible to accurately superimpose a color visible image and an invisible infrared image on one screen, work for adjusting display positions of the visible image and the infrared image to each other is unnecessary, the projector is excellent in usability, and, since a display system can be reduced in size, the projector is excellent in portability.

According to this embodiment, lights in close wavelength regions are separated by one PBS prism 55 or 56. Therefore, there is also an advantage that it is possible to reduce bands of the PBS prisms 55 and 56 and it is easy to improve performance of the spatial characteristic.

The two spacers 58 and 59 may be replaced with wavelength selecting retarder elements. For example, the spacer 58 between the PBS prism 55 and the dichroic prism 57 may be replaced with the wavelength selecting retarder element 53 and the spacer 59 between the PBS prism 56 and the dichroic prism 57 may be replaced with the wavelength selecting retarder element 54. The polarization state of the blue light transmitted through the wavelength selecting retarder element 53 is converted from the P polarized light into the S polarized light (the polarization state of the green light is unchanged from the S polarized light). Similarly, the polarization state of the infrared light transmitted through the wavelength selecting retarder element 54 is converted from the S polarized light to the P polarized light (the polarization state of the red light is unchanged from the P polarized light). Then, the blue light and the green light reflected by the dichroic prism 57 are changed to S polarized lights and the red light and the infrared light transmitted through the dichroic prism 57 are changed to P polarized lights. In this way, it is possible to improve light usage efficiency during light combination in the dichroic prism 57. In that case, the dichroic prism 57 can be replaced with a PBS prism. This is preferable because improvement in contrast of a projected image is easily realized.

Sixth Embodiment

A sixth embodiment of the invention will be hereinafter explained with reference to FIGS. 11A and 11B and FIGS. 12A to 12C.

In the fifth embodiment, the example of the projector including the reflective liquid crystal light valve as the reflective light modulation element is explained. In this embodiment, an example of a projector including a mirror array light valve as a reflective light modulation element is explained.

Figure 11A:
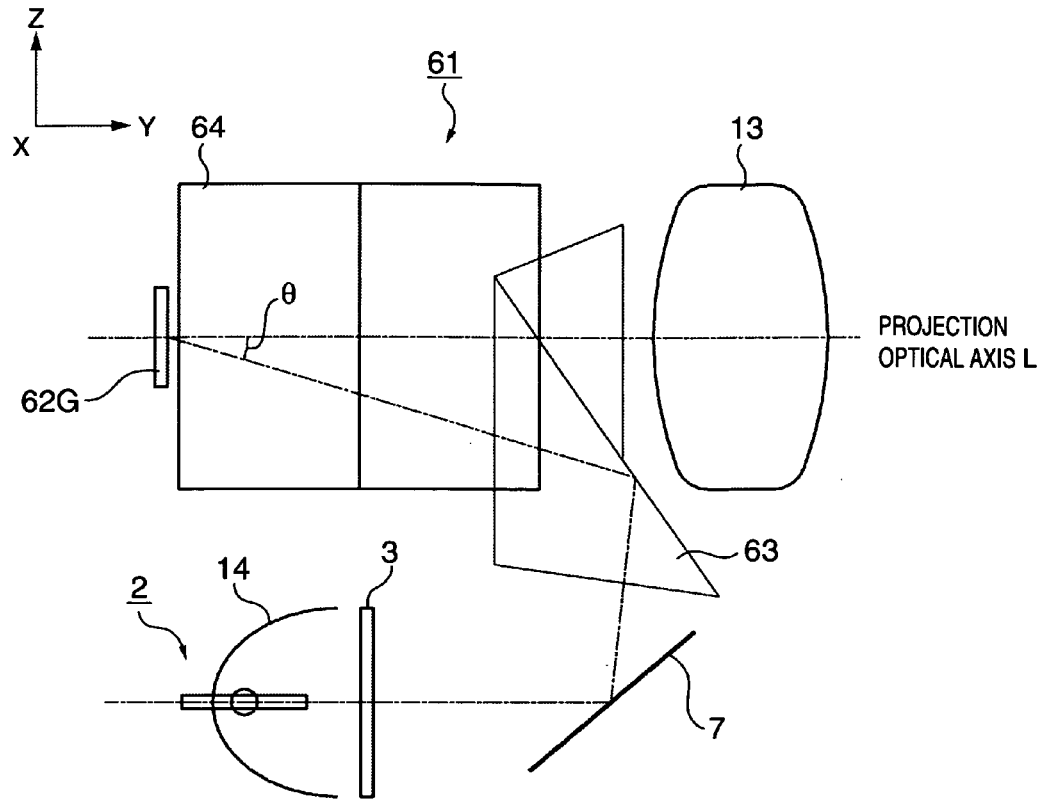
FIGS. 11A and 11B are schematic diagrams of a projector according to a sixth embodiment of the invention.
Figure 11B:
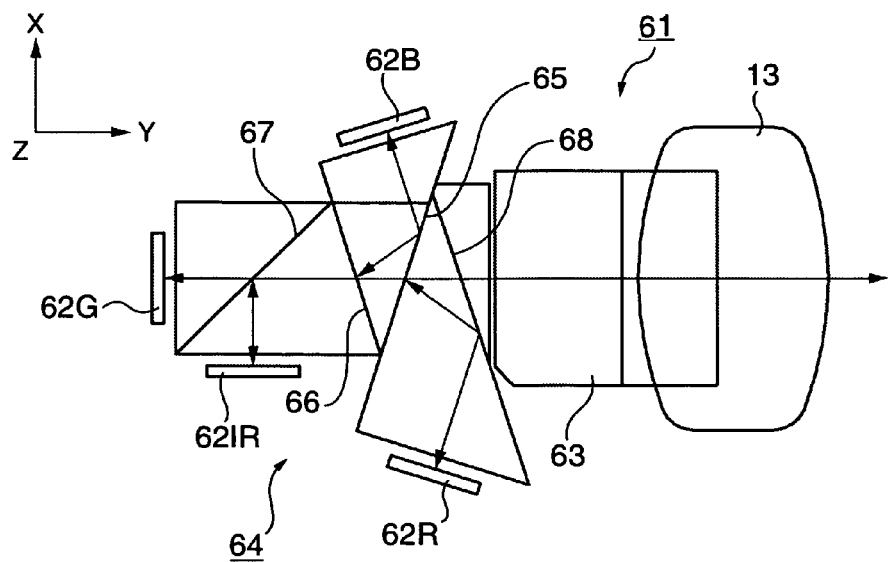
Figure 12A:
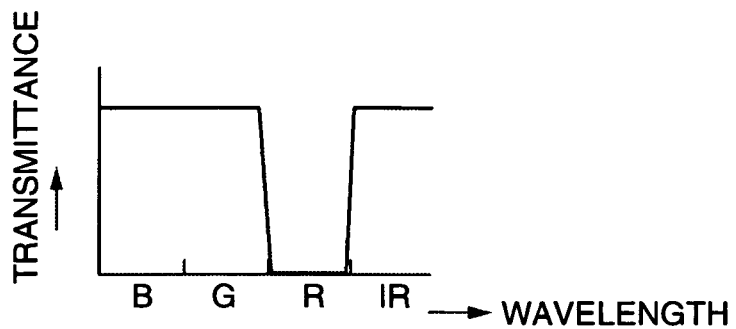
FIGS. 12A to 12C are diagrams showing spectral characteristics of dichroic mirrors used in the projector.
Figure 12B:
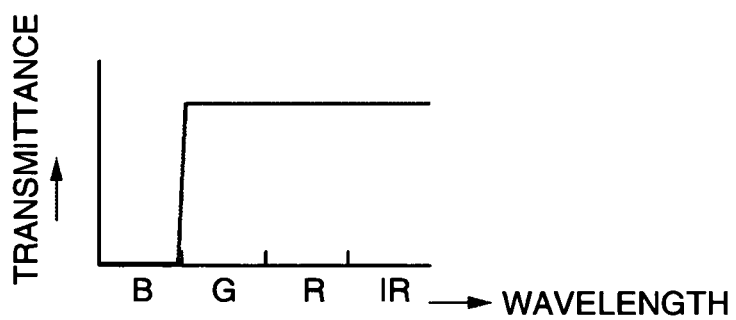
Figure 12C:
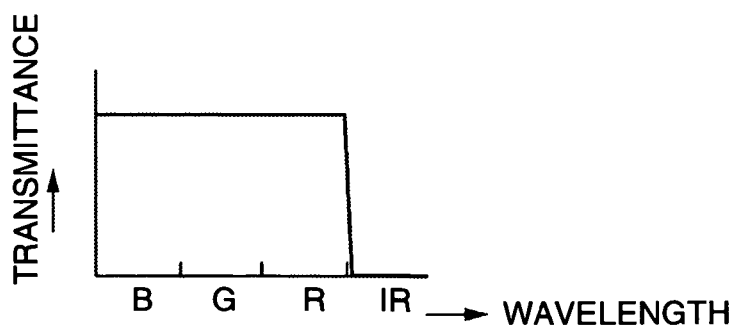

FIGS. 11A and 11B are schematic diagrams of a projector according to this embodiment. FIG. 11A is a sectional view of the projector and FIG. 11B is a plan view of the projector. FIGS. 12A to 12C are diagrams showing spectral characteristics of dichroic mirrors used in the projector. In FIGS. 11A and 11B, components same as those in FIG. 1 are denoted by the same reference numerals and signs and detailed explanation of the components is omitted.

In a projector 61 according to this embodiment, mirror array light valves 62B, 62G, 62R, and 62IR (e.g., DMD of Texas Instrument Incorporated), in which plural micromirrors are arranged in array, are used as reflective light modulation elements. As shown in FIG. 11A, after unnecessary ultraviolet light is removed by the ultraviolet cut filter 3, illumination light emitted from the light source 2, which mainly radiates visible light and infrared light, is made incident on a dichroic prism unit 64 from a down side with respect to a projection optical axis L (in such a manner as to cross an XY plane) through the reflection mirror 7 and a TIR (total internal reflection) prism unit 63.

The dichroic prism unit 64 is a light separating element including, as shown in FIG. 11B, three dichroic mirrors 65, 66, and 67 (light separating means) and a reflection surface 68 having air gap. In the light from the light source 2 made incident on the dichroic prism unit 64, first, red light is reflected and separated by the dichroic mirror 65, a spectral characteristic of which is shown in FIG. 12A. Subsequently, blue light is reflected and separated by the dichroic mirror 66, a spectral characteristic of which is shown in FIG. 12B. Infrared light is reflected and separated by the dichroic mirror 67, a spectral characteristic of which is shown in FIG. 12C. The dichroic mirror 65 has air gap.

The red light reflected and separated by the dichroic mirror 65 is totally reflected by the reflection surface 68 having the air gaps because the red light is made incident on the reflection surface 68 at a large angle with respect thereto. The red light is made incident on the mirror array light valve for red light 62R from a down side in such a manner as to cross the XY plane. Similarly, as in the case of the red light the blue light reflected and separated by the dichroic mirror 66 is totally reflected by the dichroic mirror 65 having the air gap and made incident on the mirror array light valve for blue light 62B. The infrared light reflected and separated by the dichroic mirror 67 is made incident on the mirror array light valve for infrared light 62IR. Green light transmitted and separated through the dichroic mirror 67 is made incident on the mirror array light valve for green light 62G.

In the respective mirror array light valves 62B, 62G, 62R, and 62IR, light intensities of the lights are modulated on the basis of information from the outside and the lights are emitted as color light and infrared light including image information. At this point, reflecting directions of the respective lights are changed to a direction substantially parallel to the XY plane. The respective lights emitted from the respective mirror array light valves 62B, 62G, 62R, and 62IR travel along the projection optical axis L while following paths substantially opposite to those at the time of incidence on the mirror array light valves. The lights are sequentially combined by the dichroic prism 64 to be one projected light. At this point, the projected light is made incident on the dichroic mirror 65 and the reflection surface 68 having the air gap. However, since an incidence angle with respect to the surface of the dichroic mirror 65 and the reflection surface 68 is small, most of the projected light is transmitted without being reflected. The projected light is directly transmitted through the TIR prism unit 63 (since an incidence angle is small on a total reflection surface of the TIR prism unit 63, the projected light is not reflected) and projected on the screen by the projection lens 13.

With the projector 61 according to this embodiment, it is possible to obtain effects same as those in the first to fifth embodiments, i.e., it is possible to accurately superimpose a color visible image and an invisible infrared image on one screen, work for adjusting display positions of the visible image and the infrared image to each other is unnecessary, the projector is excellent in usability, and, since a display system can be reduced in size, the projector is excellent in portability.

First Modification

A first modification of the invention will be hereinafter explained with reference to FIGS. 13 and 14.

In the first modification, platy dichroic mirrors are used as light combining means instead of the dichroic prisms in the projector according to the first embodiment.

Figure 13:
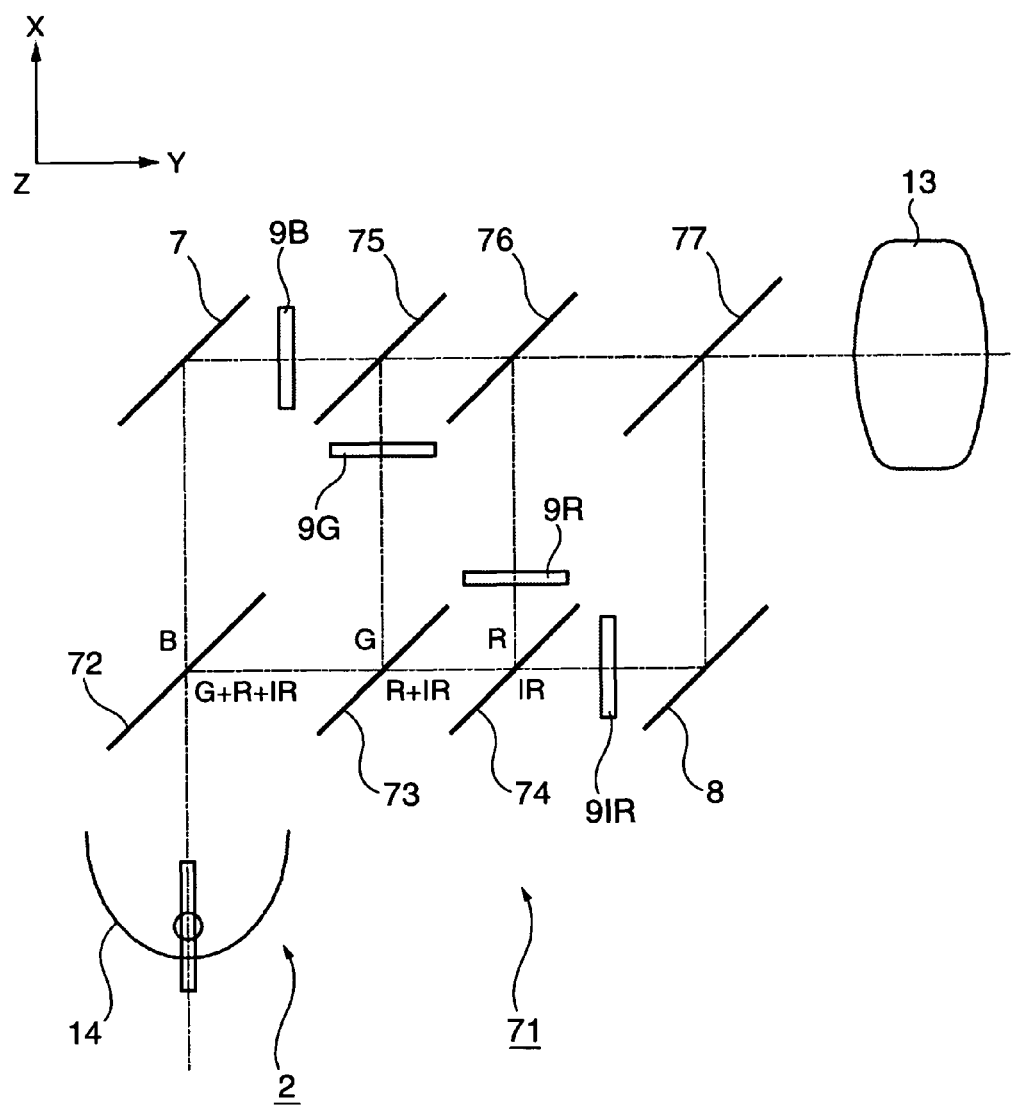
FIG. 13 is a schematic diagram of a projector according to a first modification of the invention.

FIG. 13 is a schematic diagram of a projector according to this embodiment. FIGS. 14A to 14F are diagrams showing spectral characteristics of dichroic mirrors used in the projector. In FIG. 13, components same as those shown in FIG. 1 are denoted by the same reference numerals and signs and detailed explanation of the components is omitted.

Figure 14A:
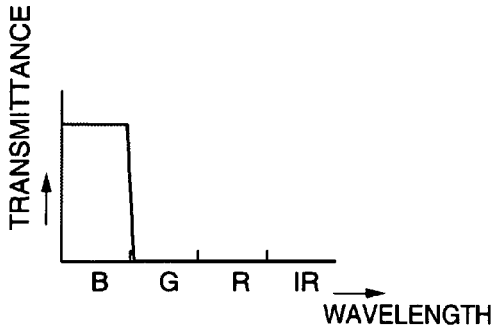
FIGS. 14A to 14F are diagrams showing spectral characteristics of dichroic mirrors used in the projector.
Figure 14D:
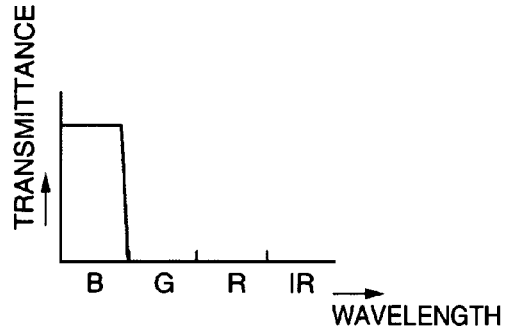
Figure 14B:
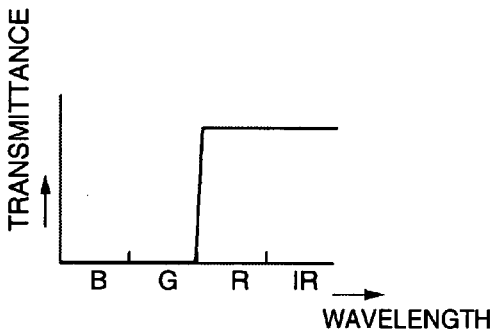
Figure 14E:
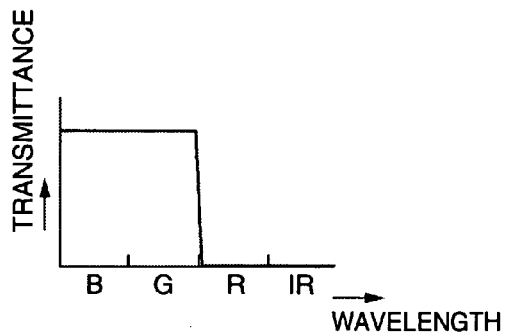
Figure 14C:
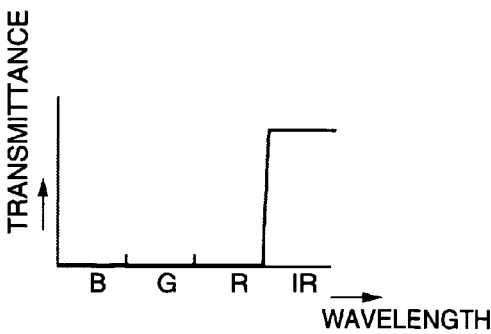
Figure 14F:
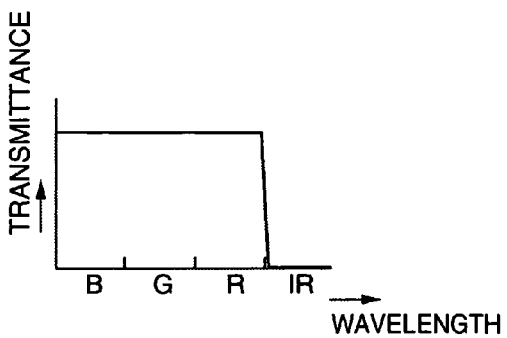

FIG. 14A shows a spectral characteristic of a dichroic mirror 72. FIG. 14B shows a spectral characteristic of a dichroic mirror 73. FIG. 14C shows a spectral characteristic of a dichroic mirror 74. FIG. 14D shows a spectral characteristic of a dichroic mirror 75. FIG. 14E shows a spectral characteristic of a dichroic mirror 76. FIG. 14F shows a spectral characteristic of a dichroic mirror 77.

In a projector 71 according to the first modification, the dichroic mirrors 72, 73, and 74 are used as light separating means and the dichroic mirrors 75, 76, and 77 are used as light combining means. Otherwise, the projector 71 is the same as the projector according to the first embodiment.

With the projector 71 according to this modification, it is possible to obtain effects same as those in the embodiments described above, i.e., it is possible to accurately superimpose a color visible image and an invisible infrared image on one screen, work for adjusting display positions of the visible image and the infrared image to each other is unnecessary, the projector is excellent in usability, and, since a display system can be reduced in size, the projector is excellent in portability.

Moreover, in the structure of the projector 71 according to this modification, since inexpensive dichroic mirrors are used as light combining means, it is easy to reduce apparatus cost compared with the first embodiment. On the contrary, there is a disadvantage that an optical characteristic is inferior (since distances between the projection lens and the respective light valves are large, this is disadvantageous for increase in luminance and astigmatism occurs in the dichroic mirrors serving as light combining means).

Second Modification

A second modification of the invention will be hereinafter explained with reference to FIG. 15 to FIGS. 17A to 17D.

In the second modification, platy dichroic mirrors are used as light combining means instead of the dichroic prisms in the projector according to the fourth embodiment.

Figure 15:
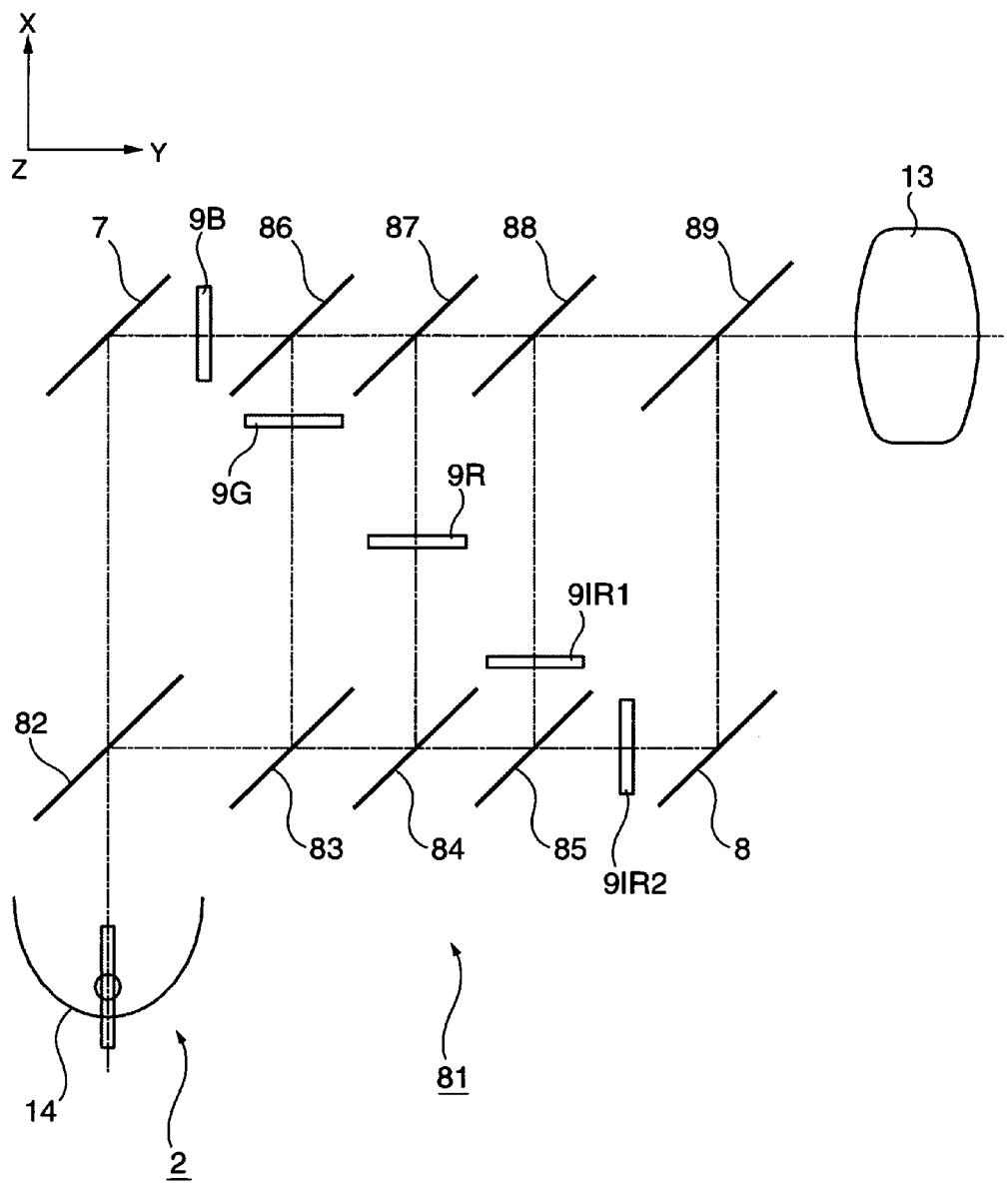
FIG. 15 is a schematic diagram of a projector according to a second modification of the invention.

FIG. 15 is a schematic diagram of a projector according to this modification. FIGS. 16A to 16D and FIGS. 17A to 17D are diagrams showing spectral characteristics of dichroic mirrors used in the projector. In FIG. 15, components same as those shown in FIG. 6 of the fourth embodiment are denoted by the same reference numerals and signs and detailed explanation of the components is omitted.

Figure 16A:
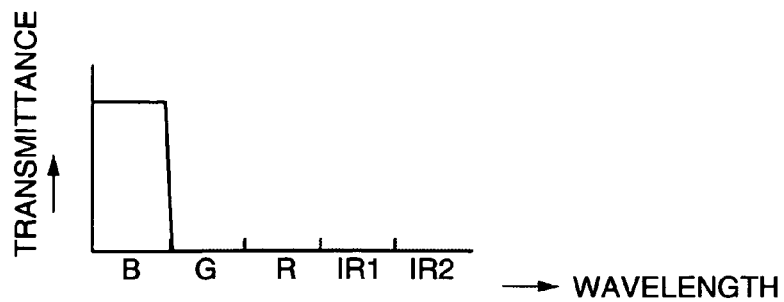
FIGS. 16A to 16D are diagrams showing spectral characteristics of dichroic mirrors used in the projector.
Figure 16B:
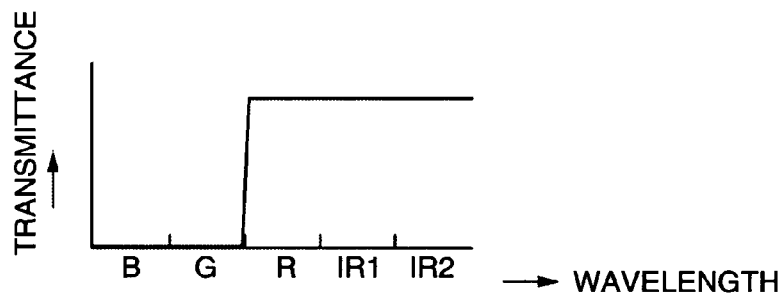
Figure 16C:
Figure 16D:
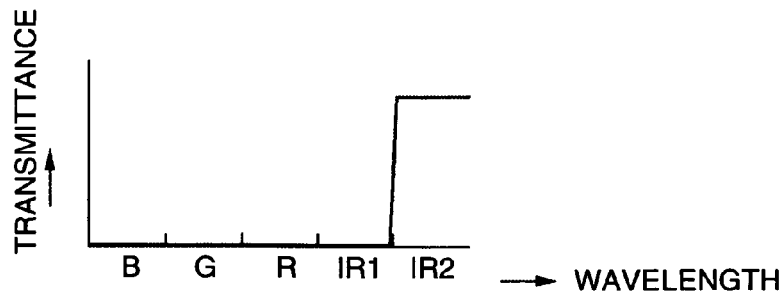
Figure 17A:
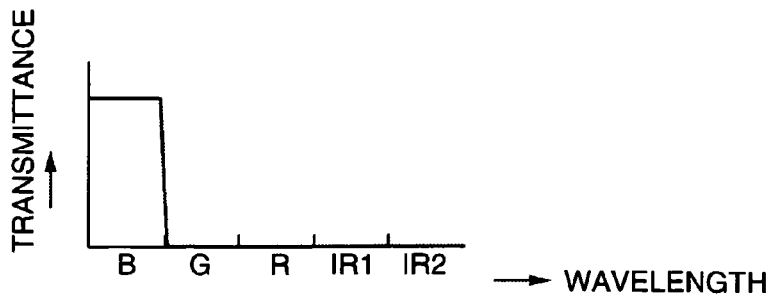
FIGS. 17A to 17D are diagrams showing spectral characteristics of the dichroic mirror used in the projector.
Figure 17B:
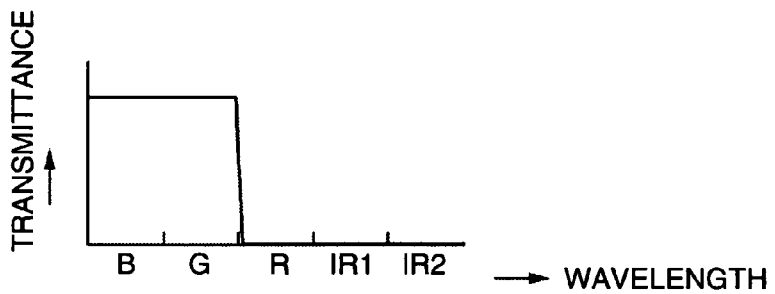
Figure 17C:
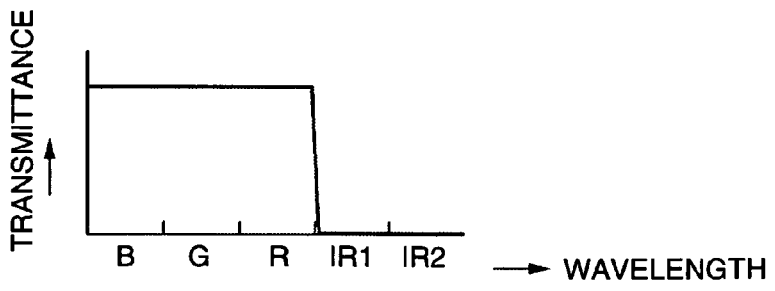
Figure 17D:
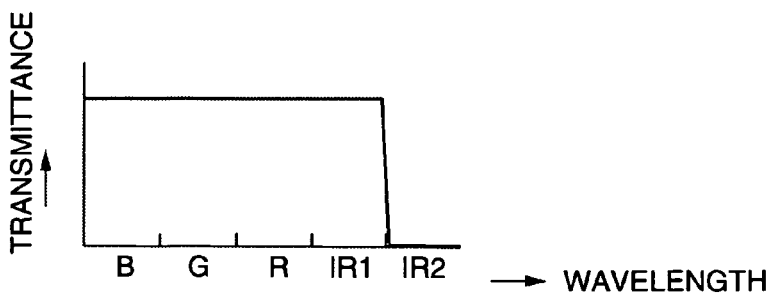

FIG. 16A shows a spectral characteristic of a dichroic mirror 82. FIG. 16B shows a spectral characteristic of a dichroic mirror 83. FIG. 16C shows a spectral characteristic of a dichroic mirror 84. FIG. 16D shows a spectral characteristic of a dichroic mirror 85. FIG. 17A shows a spectral characteristic of a dichroic mirror 86. FIG. 17B shows a spectral characteristic of a dichroic mirror 87. FIG. 17C shows a spectral characteristic of a dichroic mirror 88. FIG. 17D shows a spectral characteristic of a dichroic mirror 89.

In a projector 81 according to this modification, the dichroic mirrors 82, 83, 84, and 85 are used as light separating means and the dichroic mirrors 86, 87, 88, and 89 are used as light combining means. Otherwise, the projector 81 is the same as the projector according to the fourth embodiment.

Actions and effects of this modification are the same as those of the first modification. It goes without saying that dichroic mirrors can be used instead of the dichroic prisms in optical structures of the embodiments (e.g., the fifth embodiment) other than the first and fourth embodiments.

A technical scope of the invention is not limited to the embodiments described above. It is possible to apply various modifications to the embodiments without departing from the spirit of the invention. For example, in the embodiments, as the color lights, the blue light, the green light, and the red light are assumed. However, the color lights are not always limited to these three colors. Various modifications are possible according to applications. For example, color lights of four or more colors may be used. Conversely, color lights of two colors or color light of a single color may be used (it goes without saying that light modulation elements for visible light corresponding to the number of color lights need to be used). Details of the examples of the components described in the embodiments are not limited to the examples and can be changed as appropriate. For example, a rod integrator or a lens array integrator may be arranged as light intensity equalizing means on an exiting side of a light source.

The entire disclosure of Japanese Patent Application No. 2007-011378 filed Jan. 22, 2007 is expressly incorporated by reference herein.

What is claimed is:

1. A projector comprising:
    a light source that emits light including visible light and infrared light;
    a light separating unit that separates the light from the light source into lights in plural different wavelength regions;
    at least one light modulation element for visible light that modulates visible light separated by the light separating unit;
    at least one light modulation element for infrared light that modulates one kind of infrared light or at least two kinds of infrared light in wavelength regions different from each other separated by the light separating units;
    a light combining unit that combines the modulated light modulated by the light modulation element for visible light and the modulated light modulated by the light modulation element for infrared light into one to form combined light; and a projecting unit that projects and displays the combined light combined by the light combining unit on a projection surface, wherein the projector superimposes and displays a visible light image formed by the light modulation element for visible light and an infrared image formed by the light modulation element for infrared light on the identical projection surface, and a physical distance from one of the at least one light modulation element for visible light to the projecting unit and a physical distance from one of the at least one light modulation element for infrared light to the projecting unit are set different from each other such that the physical distance from the one of the at least one light modulation element for infrared light to the projecting unit is greater than the physical distance from the one of the at least one light modulation element for visible light to the projecting unit.

2. The projector according to claim 1, wherein the light modulation element for visible light and the light modulation element for infrared light are light modulation elements having identical dimensions of an image display area and identical resolution.

3. The projector according to claim 1, further comprising:
an infrared-light separating unit that separates the infrared light into plural infrared lights in wavelength regions different from one another; and
plural light modulation elements for infrared light that respectively modulate the plural infrared lights in wavelength regions different from one another separated by the infrared-light separating unit.

4. The projector according to claim 1, wherein the light combining unit is a prism made of a medium having a refractive index larger than a refractive index of the air.

5. The projector according to claim 1, wherein
the light modulation element for infrared light is a liquid crystal light valve, and
a polarizer attached to the liquid crystal light valve is a light reflective polarizer or a light absorptive polarizer containing metal.

6. The projector according to claim 1, wherein the light modulation element for visible light and the light modulation element for infrared light are any one of a transmissive liquid crystal light valve, a reflective liquid crystal light valve, and a micromirror array element.

7. The projector according to claim 1, wherein the projector has a function of displaying, on the projection surface, a marker that indicates a state of display of the infrared image.

8. The projector according to claim 1, wherein the projector includes, in an apparatus main body, an indicator that indicates a state of display of the infrared image.

9. A projector comprising:
a first light source that emits light including visible light;
a second light source that emits light including infrared light;
a light separating unit that separates the light from at least the first light source into lights in plural wavelength regions different from one another;
at least one light modulation element for visible light that modulates visible light separated by the light separating unit;
at least one light modulation element for infrared light that modulates infrared light from the second light source;
a light combining unit that combines the modulated light modulated by the light modulation element for visible light and the modulated light modulated by the light modulation element for infrared light into one to form combined light; and a projecting unit that projects and displays the combined light combined by the light combining unit on a projection surface, wherein the projector superimposes and displays a visible light image formed by the light modulation element for visible light and an infrared image formed by the light modulation element for infrared light on the identical projection surface, and a physical distance from one of the at least one light modulation element for visible light to the projecting unit and a physical distance from one of the at least one light modulation element for infrared light to the projecting unit are set different from each other such that the physical distance from the one of the at least one light modulation element for infrared light to the projecting unit is greater than the physical distance from the one of the at least one light modulation element for visible light to the projecting unit.

10. The projector according to claim 9, wherein
the light modulation element for infrared light is a liquid crystal light valve, and
a polarizer attached to the liquid crystal light valve is a light reflective polarizer or a light absorptive polarizer containing metal.

11. A projector comprising:
plural light sources having light emission wavelength regions different from one another;
at least one light modulation element for visible light that modulates visible light emitted from each of the plural light sources;
at least one light modulation element for infrared light that modulates one kind of infrared light or at least two kinds of infrared light in wavelength regions different from each other emitted from each of the plural light sources;
a light combining unit that combines the modulated light modulated by the light modulation element for visible light and the modulated light modulated by the light modulation element for infrared light into one to form combined light; and
a projecting unit that projects and displays the combined light combined by the light combining unit on a projection surface, wherein the projector superimposes and displays a visible light image formed by the light modulation element for visible light and an infrared image formed by the light modulation element for infrared light on the identical projection surface, and a physical distance from one of the at least one light modulation element for visible light to the projecting unit and a physical distance from one of the at least one light modulation element for infrared light to the projecting unit are set different from each other such that the physical distance from the one of the at least one light modulation element for infrared light to the projecting unit is greater than the physical distance from the one of the at least one light modulation element for visible light to the projecting unit.

12. The projector according to claim 11, wherein
the light modulation element for infrared light is a liquid crystal light valve, and
a polarizer attached to the liquid crystal light valve is a light reflective polarizer or a light absorptive polarizer containing metal.

* * * * *